United States Patent
Lawrence

(10) Patent No.: US 10,217,026 B1
(45) Date of Patent: *Feb. 26, 2019

(54) COMPUTER ARCHITECTURE FOR EMULATING AN ASYNCHRONOUS CORRELITHM OBJECT PROCESSING SYSTEM

(71) Applicant: BANK OF AMERICA CORPORATION, Charlotte, NC (US)

(72) Inventor: Patrick N. Lawrence, Plano, TX (US)

(73) Assignee: Bank of American Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,883

(22) Filed: May 18, 2018

Related U.S. Application Data

(63) Continuation of application No. 15/824,782, filed on Nov. 28, 2017, now Pat. No. 10,019,650.

(51) Int. Cl.
| | | |
|---|---|---|
| *H03M 7/34* | (2006.01) | |
| *G06K 9/62* | (2006.01) | |
| *G06N 3/12* | (2006.01) | |
| *G06F 17/30* | (2006.01) | |
| *G06N 99/00* | (2019.01) | |

(52) U.S. Cl.
CPC ..... *G06K 9/6229* (2013.01); *G06F 17/30616* (2013.01); *G06K 9/6298* (2013.01); *G06N 3/126* (2013.01); *G06N 99/002* (2013.01); *G06N 99/005* (2013.01)

(58) Field of Classification Search
CPC . G06F 17/30616; B82Y 10/00; G06N 99/002; G06N 99/00; G06N 99/005; H03M 7/00
USPC .............................................. 341/50, 51, 87
See application file for complete search history.

(56) References Cited

U.S. PATENT DOCUMENTS

| | | | |
|---|---|---|---|
| 5,946,673 A | 8/1999 | Francone et al. | |
| 6,044,366 A * | 3/2000 | Graffe | G06F 17/30592 |
| 6,167,391 A * | 12/2000 | Lawrence | G06N 3/10 |
| | | | 706/16 |
| 6,553,365 B1 * | 4/2003 | Summerlin | G06F 17/2785 |
| | | | 707/740 |

(Continued)

OTHER PUBLICATIONS

U.S. Appl. No. 15/824,782, Issue Date Jul. 10, 2018.*

(Continued)

*Primary Examiner* — Linh Nguyen
(74) *Attorney, Agent, or Firm* — Michael A. Springs

(57) ABSTRACT

A device that includes a node engine configured to emulate a first node, a second node, and a third node. The first node is configured to receive a first correlithm object, fetch a second correlithm object based on the first correlithm object, and output the second correlithm object to the second node and the third node. Each correlithm object is a point in an n-dimensional space represented by a binary string. The second node is configured to receive the second correlithm object, fetch a third correlithm object based on the second correlithm object, and output the third correlithm object to the third node. The third node is configured to receive the second correlithm object, receive the third correlithm object, fetch a fourth correlithm object based on the second correlithm object and the third correlithm object, and output the fourth correlithm object.

20 Claims, 14 Drawing Sheets

(56) References Cited

U.S. PATENT DOCUMENTS

| | | | |
|---|---|---|---|
| 6,941,287 | B1 | 9/2005 | Vaidyanathan et al. |
| 6,943,686 | B2 | 9/2005 | Allen |
| 6,947,913 | B1 * | 9/2005 | Lawrence ............ G06N 99/005 706/12 |
| 7,015,835 | B2 | 3/2006 | Lawrence et al. |
| 7,031,969 | B2 | 4/2006 | Lawrence et al. |
| 7,246,129 | B2 | 7/2007 | Lawrence et al. |
| 7,310,622 | B2 | 12/2007 | Lawrence et al. |
| 7,349,928 | B2 | 3/2008 | Lawrence et al. |
| 2003/0158850 | A1 * | 8/2003 | Lawrence ......... G06F 17/30616 |
| 2004/0044940 | A1 * | 3/2004 | Lawrence ............. B82Y 10/00 714/746 |

OTHER PUBLICATIONS

Meersman, R. et al., "On the Move to Meaningful Internet Systems 2005: CoopIS, DOA and ODBASE," OTM Confederated International Conferences CoopIS, DOA and ODBASE Oct. 2005 Agia Napa, Cyprus, Proceedings, Part I, Oct. 31-Nov. 4, 2005, pp. 763-779.

Lawrence, P. N., "Correlithm Object Technology," Apr. 2004, 229 pages.

Lawrence, P. N., "Computer Architecture for Emulating a Synchronous Correlithm Object Processing System," U.S. Appl. No. 15/823,921, 75 pages.

Lawrence, P. N., "Computer Architecture For Emulating Digital Delay Nodes in a Correlithm Object Processing System," U.S. Appl. No. 15/824,176, filed Nov. 28, 2017, 73 pages.

Lawrence, P. N., "Computer Architecture For Emulating Parallel Processing in a Correlithm Object Processing System," U.S. Appl. No. 15/824,480, filed Nov. 28, 2017, 77 pages.

Lawrence, P. N., "Computer Architecture For Emulating Master-Slave Controllers For a Correlithm Object Processing System," U.S. Appl. No. 15/824,709, filed Nov. 28, 2017, 77 pages.

Lawrence, P. N., "Computer Architecture For Emulating Digital Delay Lines in a Correlithm Object Processing System," U.S. Appl. No. 15/824,835, 74 pages.

* cited by examiner

| | Time | Input | Output | |
|---|---|---|---|---|
| | T0 | X0 | | ← 700 |
| | T1 | X0 | X0 | |
| | T2 | X0 | X0 | |
| 708 | T3 | X1 | X0 | |
| | T4 | X1 | X1 | |
| | T5 | X1 | X1 | |

| | Time | Input | State Input | Output | |
|---|---|---|---|---|---|
| | T0 | X0 | | | ← 750 |
| | T1 | | | X0 | |
| 760 | T2 | | X0 | X0 | |
| | T3 | X1 | X0 | X0 | |
| | T4 | | | X1 | |
| | T5 | | X1 | X1 | |

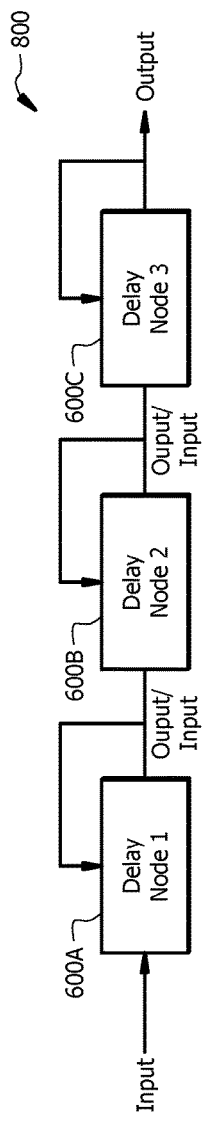

COMPUTER ARCHITECTURE FOR EMULATING AN ASYNCHRONOUS CORRELITHM OBJECT PROCESSING SYSTEM

CROSS-REFERENCE TO RELATED APPLICATIONS

The present application is a continuation of U.S. Non-provisional application Ser. No. 15/824,782 filed Nov. 28, 2017 by Patrick N. Lawrence and titled "COMPUTER ARCHITECTURE FOR EMULATING AN ASYNCHRONOUS CORRELITHM OBJECT PROCESSING SYSTEM," which is hereby incorporated by reference as if reproduced in its entirety.

TECHNICAL FIELD

The present disclosure relates generally to computer architectures for emulating a processing system, and more specifically to computer architectures for emulating a correlithm object processing system.

BACKGROUND

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many security applications such as face recognition, voice recognition, and fraud detection.

Thus, it is desirable to provide a solution that allows computing systems to efficiently determine how similar different data samples are to each other and to perform operations based on their similarity.

SUMMARY

Conventional computers are highly attuned to using operations that require manipulating ordinal numbers, especially ordinal binary integers. The value of an ordinal number corresponds with its position in a set of sequentially ordered number values. These computers use ordinal binary integers to represent, manipulate, and store information. These computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations.

Ordinal based number systems only provide information about the sequence order of the numbers themselves based on their numeric values. Ordinal numbers do not provide any information about any other types of relationships for the data being represented by the numeric values such as similarity. For example, when a conventional computer uses ordinal numbers to represent data samples (e.g. images or audio signals), different data samples are represented by different numeric values. The different numeric values do not provide any information about how similar or dissimilar one data sample is from another. Unless there is an exact match in ordinal number values, conventional systems are unable to tell if a data sample matches or is similar to any other data samples. As a result, conventional computers are unable to use ordinal numbers by themselves for comparing different data samples and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system. The ability to compare unknown data samples to known data samples is crucial for many applications such as security application (e.g. face recognition, voice recognition, and fraud detection).

The system described in the present application provides a technical solution that enables the system to efficiently determine how similar different objects are to each other and to perform operations based on their similarity. In contrast to conventional systems, the system uses an unconventional configuration to perform various operations using categorical numbers and geometric objects, also referred to as correlithm objects, instead of ordinal numbers. Using categorical numbers and correlithm objects on a conventional device involves changing the traditional operation of the computer to support representing and manipulating concepts as correlithm objects. A device or system may be configured to implement or emulate a special purpose computing device capable of performing operations using correlithm objects. Implementing or emulating a correlithm object processing system improves the operation of a device by enabling the device to perform non-binary comparisons (i.e. match or no match) between different data samples. This enables the device to quantify a degree of similarity between different data samples. This increases the flexibility of the device to work with data samples having different data types and/or formats, and also increases the speed and performance of the device when performing operations using data samples.

These technical advantages and other improvements to the device are described in more detail throughout the disclosure.

In one embodiment, the system is configured to use binary integers as categorical numbers rather than ordinal numbers which enables the system to determine how similar a data sample is to other data samples. Categorical numbers provide information about similar or dissimilar different data samples are from each other. For example, categorical numbers can be used in facial recognition applications to represent different images of faces and/or features of the faces. The system provides a technical advantage by allowing the system to assign correlithm objects represented by categorical numbers to different data samples based on how similar they are to other data samples. As an example, the system is able to assign correlithm objects to different images of people such that the correlithm objects can be directly used to determine how similar the people in the images are to each other. In other words, the system is able to use correlithm objects in facial recognition applications to quickly determine whether a captured image of a person matches any previously stored images without relying on conventional signal processing techniques.

Correlithm object processing systems use new types of data structures called correlithm objects that improve the way a device operates, for example, by enabling the device to perform non-binary data set comparisons and to quantify the similarity between different data samples. Correlithm objects are data structures designed to improve the way a device stores, retrieves, and compares data samples in memory. Correlithm objects also provide a data structure that is independent of the data type and format of the data samples they represent. Correlithm objects allow data samples to be directly compared regardless of their original data type and/or format.

A correlithm object processing system uses a combination of a sensor table, a node table, and/or an actor table to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures.

In addition, correlithm object processing system uses a combination of a sensor table, a node table, and/or an actor table to provide a particular manner for transforming data samples between ordinal number representations and correlithm objects in a correlithm object domain. Transforming data samples between ordinal number representations and correlithm objects involves fundamentally changing the data type of data samples between an ordinal number system and a categorical number system to achieve the previously described benefits of the correlithm object processing system.

Using correlithm objects allows the system or device to compare data samples (e.g. images) even when the input data sample does not exactly match any known or previously stored input values. For example, an input data sample that is an image may have different lighting conditions than the previously stored images. The differences in lighting conditions can make images of the same person appear different from each other. The device uses an unconventional configuration that implements a correlithm object processing system that uses the distance between the data samples which are represented as correlithm objects and other known data samples to determine whether the input data sample matches or is similar to the other known data samples. Implementing a correlithm object processing system fundamentally changes the device and the traditional data processing paradigm. Implementing the correlithm object processing system improves the operation of the device by enabling the device to perform non-binary comparisons of data samples. In other words, the device is able to determine how similar the data samples are to each other even when the data samples are not exact matches. In addition, the device is able to quantify how similar data samples are to one another. The ability to determine how similar data samples are to each other is unique and distinct from conventional computers that can only perform binary comparisons to identify exact matches.

The problems associated with comparing data sets and identifying matches based on the comparison are problems necessarily rooted in computer technologies. As described above, conventional systems are limited to a binary comparison that can only determine whether an exact match is found. Emulating a correlithm object processing system provides a technical solution that addresses problems associated with comparing data sets and identifying matches. Using correlithm objects to represent data samples fundamentally changes the operation of a device and how the device views data samples. By implementing a correlithm object processing system, the device can determine the distance between the data samples and other known data samples to determine whether the input data sample matches or is similar to the other known data samples. In addition, the device is able to determine a degree of similarity that quantifies how similar different data samples are to one another.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 8 is a schematic diagram of an embodiment of a correlithm object delay line that includes multiple stages of correlithm object delay nodes;

FIG. 9 is an embodiment of a table that demonstrating an example delay operation for correlithm object delay line;

DETAILED DESCRIPTION

FIGS. 1-5 generally describe various embodiments of how a correlithm object processing system may be implemented or emulated in hardware, such as a special purpose computer.

Figure 1:
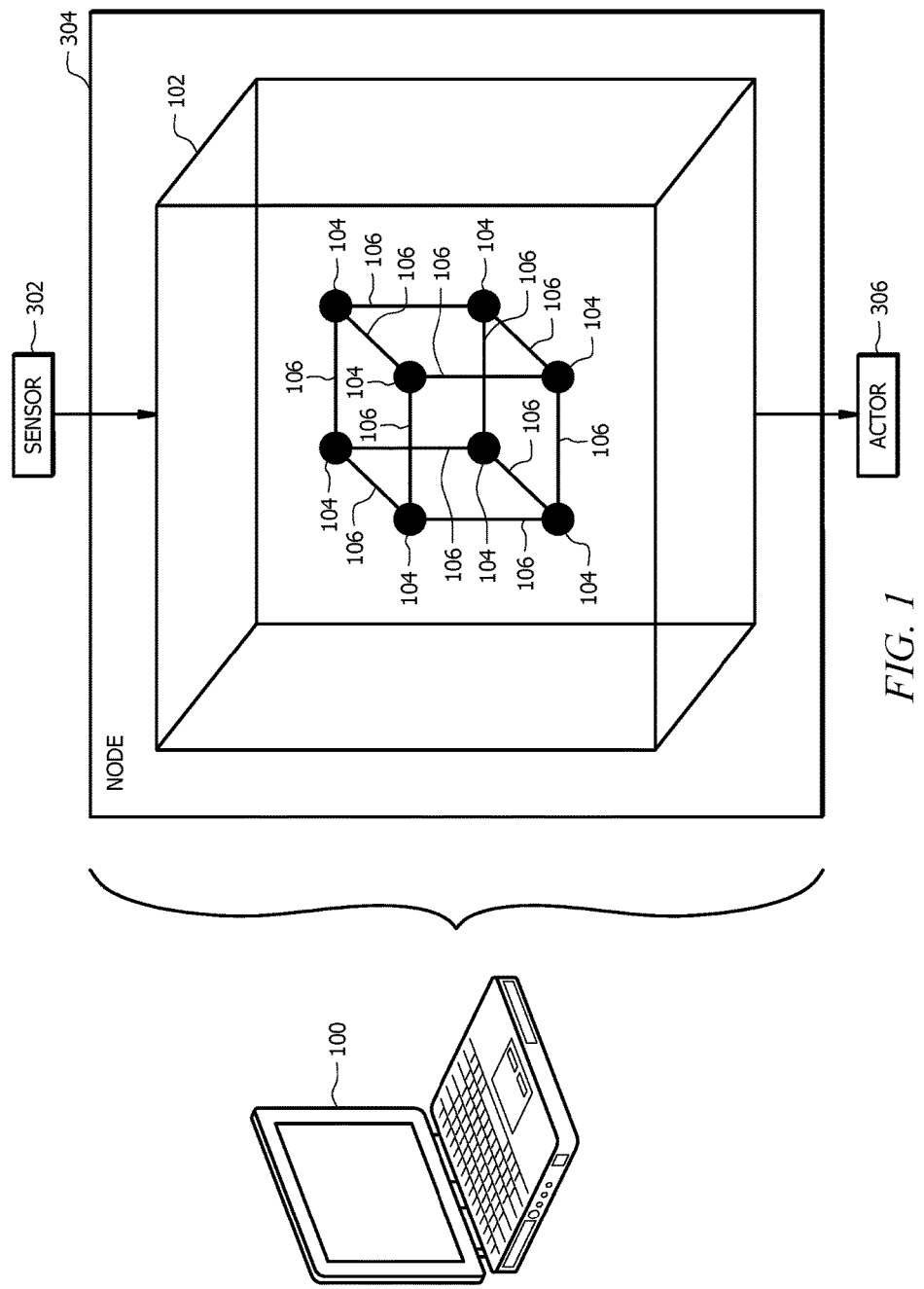
FIG. 1 is a schematic view of an embodiment of a special purpose computer implementing correlithm objects in an n-dimensional space.

FIG. 1 is a schematic view of an embodiment of a user device 100 implementing correlithm objects 104 in an n-dimensional space 102. Examples of user devices 100 include, but are not limited to, desktop computers, mobile phones, tablet computers, laptop computers, or other special purpose computer platforms. The user device 100 is configured to implement or emulate a correlithm object processing system that uses categorical numbers to represent data samples as correlithm objects 104 in a high-dimensional space 102, for example a high-dimensional binary cube. Additional information about the correlithm object processing system is described in FIG. 3. Additional information about configuring the user device 100 to implement or emulate a correlithm object processing system is described in FIG. 5.

Conventional computers rely on the numerical order of ordinal binary integers representing data to perform various operations such as counting, sorting, indexing, and mathematical calculations. Even when performing operations that involve other number systems (e.g. floating point), conventional computers still resort to using ordinal binary integers to perform any operations. Ordinal based number systems only provide information about the sequence order of the numbers themselves based on their numeric values. Ordinal numbers do not provide any information about any other types of relationships for the data being represented by the numeric values, such as similarity. For example, when a conventional computer uses ordinal numbers to represent data samples (e.g. images or audio signals), different data samples are represented by different numeric values. The different numeric values do not provide any information about how similar or dissimilar one data sample is from another. In other words, conventional computers are only able to make binary comparisons of data samples which only results in determining whether the data samples match or do not match. Unless there is an exact match in ordinal number values, conventional systems are unable to tell if a data sample matches or is similar to any other data samples. As a result, conventional computers are unable to use ordinal numbers by themselves for determining similarity between different data samples, and instead these computers rely on complex signal processing techniques. Determining whether a data sample matches or is similar to other data samples is not a trivial task and poses several technical challenges for conventional computers. These technical challenges result in complex processes that consume processing power which reduces the speed and performance of the system.

In contrast to conventional systems, the user device 100 operates as a special purpose machine for implementing or emulating a correlithm object processing system. Implementing or emulating a correlithm object processing system improves the operation of the user device 100 by enabling the user device 100 to perform non-binary comparisons (i.e. match or no match) between different data samples. This enables the user device 100 to quantify a degree of similarity between different data samples. This increases the flexibility of the user device 100 to work with data samples having different data types and/or formats, and also increases the speed and performance of the user device 100 when performing operations using data samples. These improvements and other benefits to the user device 100 are described in more detail below and throughout the disclosure.

For example, the user device 100 employs the correlithm object processing system to allow the user device 100 to compare data samples even when the input data sample does not exactly match any known or previously stored input values. Implementing a correlithm object processing system fundamentally changes the user device 100 and the traditional data processing paradigm. Implementing the correlithm object processing system improves the operation of the user device 100 by enabling the user device 100 to perform non-binary comparisons of data samples. In other words, the user device 100 is able to determine how similar the data samples are to each other even when the data samples are not exact matches. In addition, the user device 100 is able to quantify how similar data samples are to one another. The ability to determine how similar data samples are to each others is unique and distinct from conventional computers that can only perform binary comparisons to identify exact matches.

The user device's 100 ability to perform non-binary comparisons of data samples also fundamentally changes traditional data searching paradigms. For example, conventional search engines rely on finding exact matches or exact partial matches of search tokens to identify related data samples. For instance, conventional text-based search engine are limited to finding related data samples that have text that exactly matches other data samples. These search engines only provide a binary result that identifies whether or not an exact match was found based on the search token. Implementing the correlithm object processing system improves the operation of the user device 100 by enabling the user device 100 to identify related data samples based on how similar the search token is to other data sample. These improvements result in increased flexibility and faster search time when using a correlithm object processing system. The ability to identify similarities between data samples expands the capabilities of a search engine to include data samples that may not have an exact match with a search token but are still related and similar in some aspects. The user device 100 is also able to quantify how similar data samples are to each other based on characteristics besides exact matches to the search token. Implementing the correlithm object processing system involves operating the user device 100 in an unconventional manner to achieve these technological improvements as well as other benefits described below for the user device 100.

Computing devices typically rely on the ability to compare data sets (e.g. data samples) to one another for processing. For example, in security or authentication applications a computing device is configured to compare an input of an unknown person to a data set of known people (or biometric information associated with these people). The problems associated with comparing data sets and identifying matches based on the comparison are problems necessarily rooted in computer technologies. As described above, conventional systems are limited to a binary comparison that can only determine whether an exact match is found. As an example, an input data sample that is an image of a person may have different lighting conditions than previously stored images. In this example, different lighting conditions can make images of the same person appear different from each other. Conventional computers are unable to distinguish between two images of the same person with different lighting conditions and two images of two different people without complicated signal processing. In both of these cases, conventional computers can only determine that the images are different. This is because conventional computers rely on manipulating ordinal numbers for processing.

In contrast, the user device 100 uses an unconventional configuration that uses correlithm objects to represent data samples. Using correlithm objects to represent data samples fundamentally changes the operation of the user device 100 and how the device views data samples. By implementing a correlithm object processing system, the user device 100 can determine the distance between the data samples and other known data samples to determine whether the input data sample matches or is similar to the other known data samples, as explained in detail below. Unlike the conventional computers described in the previous example, the user device 100 is able to distinguish between two images of the same person with different lighting conditions and two images of two different people by using correlithm objects 104. Correlithm objects allow the user device 100 to determine whether there are any similarities between data samples, such as between two images that are different from each other in some respects but similar in other respects. For example, the user device 100 is able to determine that despite different lighting conditions, the same person is present in both images.

In addition, the user device 100 is able to determine a degree of similarity that quantifies how similar different data samples are to one another. Implementing a correlithm object processing system in the user device 100 improves the operation of the user device 100 when comparing data sets and identifying matches by allowing the user device 100 to perform non-binary comparisons between data sets and to quantify the similarity between different data samples. In addition, using a correlithm object processing system results in increased flexibility and faster search times when comparing data samples or data sets. Thus, implementing a correlithm object processing system in the user device 100 provides a technical solution to a problem necessarily rooted in computer technologies.

The ability to implement a correlithm object processing system provides a technical advantage by allowing the system to identify and compare data samples regardless of whether an exact match has been previous observed or stored. In other words, using the correlithm object processing system the user device 100 is able to identify similar data samples to an input data sample in the absence of an exact match. This functionality is unique and distinct from conventional computers that can only identify data samples with exact matches.

Examples of data samples include, but are not limited to, images, files, text, audio signals, biometric signals, electric signals, or any other suitable type of data. A correlithm object 104 is a point in the n-dimensional space 102, sometimes called an "n-space." The value of represents the number of dimensions of the space. For example, an n-dimensional space 102 may be a 3-dimensional space, a 50-dimensional space, a 100-dimensional space, or any other suitable dimension space. The number of dimensions depends on its ability to support certain statistical tests, such as the distances between pairs of randomly chosen points in the space approximating a normal distribution. In some embodiments, increasing the number of dimensions in the n-dimensional space 102 modifies the statistical properties of the system to provide improved results. Increasing the number of dimensions increases the probability that a correlithm object 104 is similar to other adjacent correlithm objects 104. In other words, increasing the number of dimensions increases the correlation between how close a pair of correlithm objects 104 are to each other and how similar the correlithm objects 104 are to each other.

Correlithm object processing systems use new types of data structures called correlithm objects 104 that improve the way a device operates, for example, by enabling the device to perform non-binary data set comparisons and to quantify the similarity between different data samples. Correlithm objects 104 are data structures designed to improve the way a device stores, retrieves, and compares data samples in memory. Unlike conventional data structures, correlithm objects 104 are data structures where objects can be expressed in a high-dimensional space such that distance 106 between points in the space represent the similarity between different objects or data samples. In other words, the distance 106 between a pair of correlithm objects 104 in the n-dimensional space 102 indicates how similar the correlithm objects 104 are from each other and the data samples they represent. Correlithm objects 104 that are close to each other are more similar to each other than correlithm objects 104 that are further apart from each other. For example, in a facial recognition application, correlithm objects 104 used to represent images of different types of glasses may be relatively close to each other compared to correlithm objects 104 used to represent images of other features such as facial hair. An exact match between two data samples occurs when their corresponding correlithm objects 104 are the same or have no distance between them. When two data samples are not exact matches but are similar, the distance between their correlithm objects 104 can be used to indicate their similarities. In other words, the distance 106 between correlithm objects 104 can be used to identify both data samples that exactly match each other as well as data samples that do not match but are similar. This feature is unique to a correlithm processing system and is unlike conventional computers that are unable to detect when data samples are different but similar in some aspects.

Correlithm objects 104 also provide a data structure that is independent of the data type and format of the data samples they represent. Correlithm objects 104 allow data samples to be directly compared regardless of their original data type and/or format. In some instances, comparing data samples as correlithm objects 104 is computationally more efficient and faster than comparing data samples in their original format. For example, comparing images using conventional data structures involves significant amounts of image processing which is time consuming and consumes processing resources. Thus, using correlithm objects 104 to represent data samples provides increased flexibility and improved performance compared to using other conventional data structures.

In one embodiment, correlithm objects 104 may be represented using categorical binary strings. The number of bits used to represent the correlithm object 104 corresponds with the number of dimensions of the n-dimensional space 102 where the correlithm object 102 is located. For example, each correlithm object 104 may be uniquely identified using a 64-bit string in a 64-dimensional space 102. As another example, each correlithm object 104 may be uniquely identified using a 10-bit string in a 10-dimensional space 102. In other examples, correlithm objects 104 can be identified using any other suitable number of bits in a string that corresponds with the number of dimensions in the n-dimensional space 102.

In this configuration, the distance 106 between two correlithm objects 104 can be determined based on the differences between the bits of the two correlithm objects 104. In other words, the distance 106 between two correlithm objects can be determined based on how many individual bits differ between the correlithm objects 104. The distance 106 between two correlithm objects 104 can be computed using hamming distance or any other suitable technique.

As an example using a 10-dimensional space 102, a first correlithm object 104 is represented by a first 10-bit string (1001011011) and a second correlithm object 104 is represented by a second 10-bit string (1000011011). The hamming distance corresponds with the number of bits that differ between the first correlithm object 104 and the second correlithm object 104. In other words, the hamming distance between the first correlithm object 104 and the second correlithm object 104 can be computed as follows:

1001011011

1000011011

----------

0001000000

In this example, the hamming distance is equal to one because only one bit differs between the first correlithm object 104 and the second correlithm object. As another example, a third correlithm object 104 is represented by a third 10-bit string (0110100100). In this example, the hamming distance between the first correlithm object 104 and the third correlithm object 104 can be computed as follows:

1001011011

0110100100

----------

1111111111

The hamming distance is equal to ten because all of the bits are different between the first correlithm object 104 and the third correlithm object 104. In the previous example, a hamming distance equal to one indicates that the first correlithm object 104 and the second correlithm object 104 are close to each other in the n-dimensional space 102, which means they are similar to each other. In the second example, a hamming distance equal to ten indicates that the first correlithm object 104 and the third correlithm object 104 are further from each other in the n-dimensional space 102 and are less similar to each other than the first correlithm object 104 and the second correlithm object 104. In other words, the similarity between a pair of correlithm objects can be readily determined based on the distance between the pair correlithm objects.

As another example, the distance between a pair of correlithm objects 104 can be determined by performing an XOR operation between the pair of correlithm objects 104 and counting the number of logical high values in the binary string. The number of logical high values indicates the number of bits that are different between the pair of correlithm objects 104 which also corresponds with the hamming distance between the pair of correlithm objects 104.

In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

The user device 100 is configured to implement or emulate a correlithm object processing system that comprises one or more sensors 302, nodes 304, and/or actors 306 in order to convert data samples between real world values or representations and to correlithm objects 104 in a correlithm object domain. Sensors 302 are generally configured to convert real world data samples to the correlithm object domain. Nodes 304 are generally configured to process or perform various operations on correlithm objects in the correlithm object domain. Actors 306 are generally configured to convert correlithm objects 104 into real world values or representations. Additional information about sensors 302, nodes 304, and actors 306 is described in FIG. 3.

Performing operations using correlithm objects 104 in a correlithm object domain allows the user device 100 to identify relationships between data samples that cannot be identified using conventional data processing systems. For example, in the correlithm object domain, the user device 100 is able to identify not only data samples that exactly match an input data sample, but also other data samples that have similar characteristics or features as the input data samples. Conventional computers are unable to identify these types of relationships readily. Using correlithm objects 104 improves the operation of the user device 100 by enabling the user device 100 to efficiently process data samples and identify relationships between data samples without relying on signal processing techniques that require a significant amount of processing resources. These benefits allow the user device 100 to operate more efficiently than conventional computers by reducing the amount of processing power and resources that are needed to perform various operations.

Figure 2:
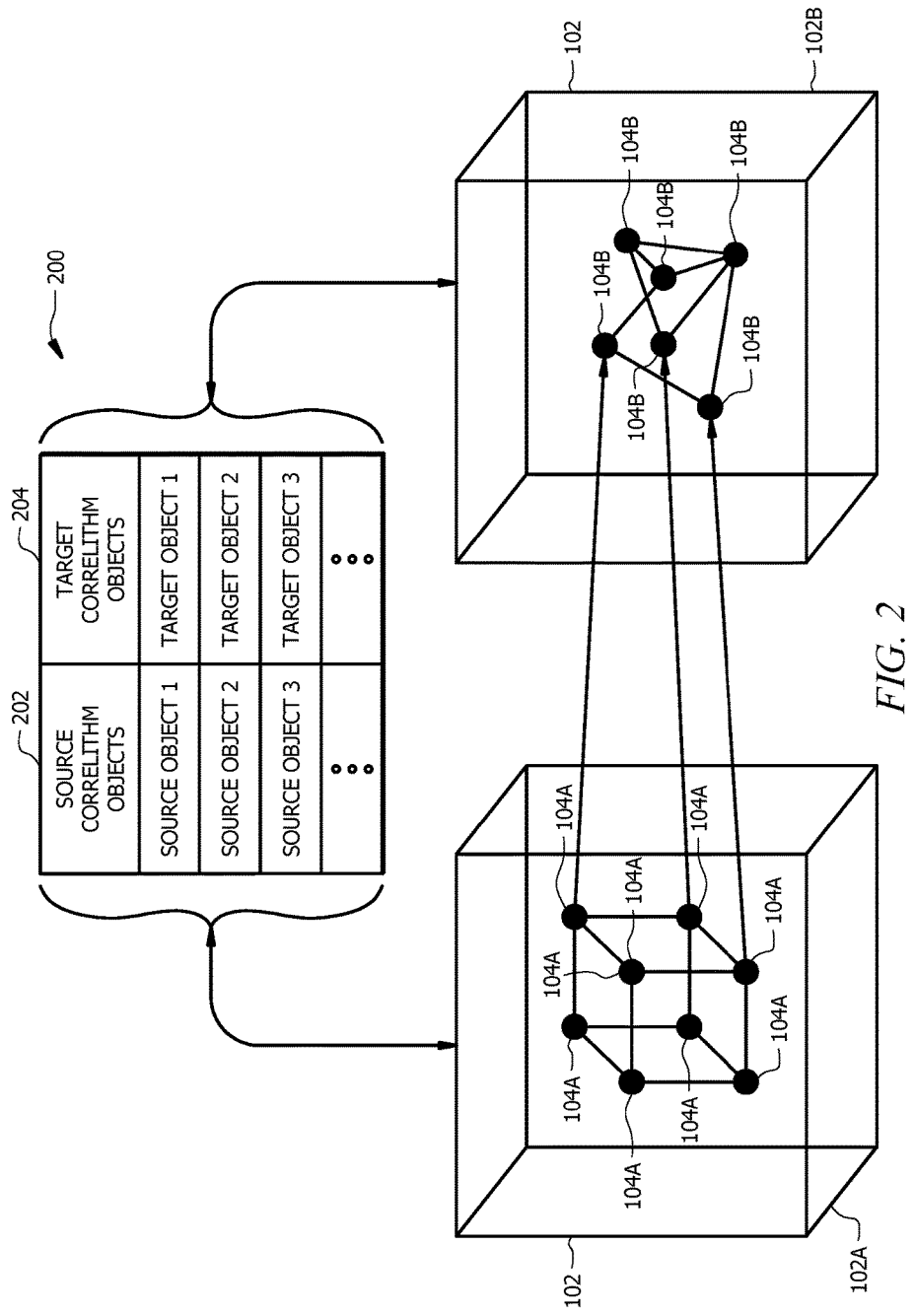
FIG. 2 is a perspective view of an embodiment of a mapping between correlithm objects in different n-dimensional spaces.

FIG. 2 is a schematic view of an embodiment of a mapping between correlithm objects 104 in different n-dimensional spaces 102. When implementing a correlithm object processing system, the user device 100 performs operations within the correlithm object domain using correlithm objects 104 in different n-dimensional spaces 102. As an example, the user device 100 may convert different types of data samples having real world values into correlithm objects 104 in different n-dimensional spaces 102. For instance, the user device 100 may convert data samples of text into a first set of correlithm objects 104 in a first n-dimensional space 102 and data samples of audio samples as a second set of correlithm objects 104 in a second n-dimensional space 102. Conventional systems require data samples to be of the same type and/or format in order to perform any kind of operation on the data samples. In some instances, some types of data samples cannot be compared because there is no common format available. For example, conventional computers are unable to compare data samples of images and data samples of audio samples because there is no common format. In contrast, the user device 100 implementing a correlithm object processing system is able to compare and perform operations using correlithm objects 104 in the correlithm object domain regardless of the type or format of the original data samples.

In FIG. 2, a first set of correlithm objects 104A are defined within a first n-dimensional space 102A and a second set of correlithm objects 104B are defined within a second n-dimensional space 102B. The n-dimensional spaces may have the same number dimensions or a different number of dimensions. For example, the first n-dimensional space 102A and the second n-dimensional space 102B may both be three dimensional spaces. As another example, the first n-dimensional space 102A may be a three dimensional space and the second n-dimensional space 102B may be a nine dimensional space. Correlithm objects 104 in the first n-dimensional space 102A and second n-dimensional space 102B are mapped to each other. In other words, a correlithm object 104A in the first n-dimensional space 102A may reference or be linked with a particular correlithm object 104B in the second n-dimensional space 102B. The correlithm objects 104 may also be linked with and referenced with other correlithm objects 104 in other n-dimensional spaces 102.

In one embodiment, a data structure such as table 200 may be used to map or link correlithm objects 194 in different n-dimensional spaces 102. In some instances, table 200 is referred to as a node table. Table 200 is generally configured to identify a first plurality of correlithm objects 104 in a first n-dimensional space 102 and a second plurality of correlithm objects 104 in a second n-dimensional space 102. Each correlithm object 104 in the first n-dimensional space 102 is linked with a correlithm object 104 is the second n-dimensional space 102. For example, table 200 may be configured with a first column 202 that lists correlithm objects 104A as source correlithm objects and a second column 204 that lists corresponding correlithm objects 104B as target correlithm objects. In other examples, table 200 may be configured in any other suitable manner or may be implemented using any other suitable data structure. In some embodiments, one or more mapping functions may be used to convert between a correlithm object 104 in a first n-dimensional space and a correlithm object 104 is a second n-dimensional space.

Figure 3:
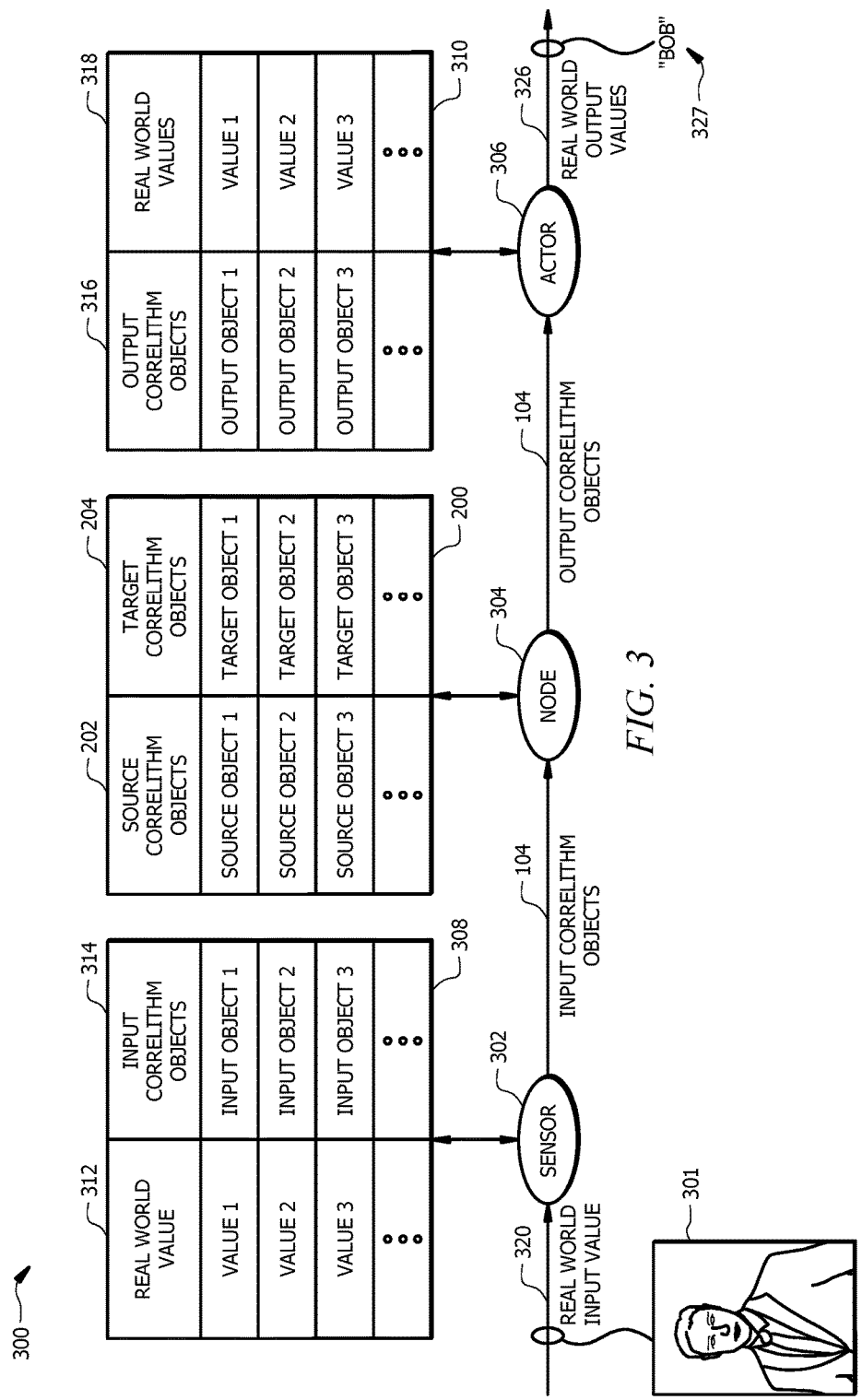
FIG. 3 is a schematic view of an embodiment of a correlithm object processing system.

FIG. 3 is a schematic view of an embodiment of a correlithm object processing system 300 that is implemented by a user device 100 to perform operations using correlithm objects 104. The system 300 generally comprises a sensor 302, a node 304, and an actor 306. The system 300 may be configured with any suitable number and/or configuration of sensors 302, nodes 304, and actors 306. An example of the system 300 in operation is described in FIG. 4. In one embodiment, a sensor 302, a node 304, and an actor 306 may all be implemented on the same device (e.g. user device 100). In other embodiments, a sensor 302, a node 304, and an actor 306 may each be implemented on different devices in signal communication with each other for example over a network. In other embodiments, different devices may be configured to implement any combination of sensors 302, nodes 304, and actors 306.

Sensors 302 serve as interfaces that allow a user device 100 to convert real world data samples into correlithm objects 104 that can be used in the correlithm object domain. Sensors 302 enable the user device 100 compare and perform operations using correlithm objects 104 regardless of the data type or format of the original data sample. Sensors 302 are configured to receive a real world value 320 representing a data sample as an input, to determine a correlithm object 104 based on the real world value 320, and to output the correlithm object 104. For example, the sensor 302 may receive an image 301 of a person and output a correlithm object 322 to the node 304 or actor 306. In one embodiment, sensors 302 are configured to use sensor tables 308 that link a plurality of real world values with a plurality of correlithm objects 104 in an n-dimensional space 102. Real world values are any type of signal, value, or representation of data samples. Examples of real world values include, but are not limited to, images, pixel values, text, audio signals, electrical signals, and biometric signals. As an example, a sensor table 308 may be configured with a first column 312 that lists real world value entries corresponding with different images and a second column 314 that lists corresponding correlithm objects 104 as input correlithm objects. In other examples, sensor tables 308 may be configured in any other suitable manner or may be implemented using any other suitable data structure. In some embodiments, one or more mapping functions may be used to translate between a real world value 320 and a correlithm object 104 is a n-dimensional space 102. Additional information for implementing or emulating a sensor 302 in hardware is described in FIG. 5.

Nodes 304 are configured to receive a correlithm object 104 (e.g. an input correlithm object 104), to determine another correlithm object 104 based on the received correlithm object 104, and to output the identified correlithm object 104 (e.g. an output correlithm object 104). In one embodiment, nodes 304 are configured to use node tables 200 that link a plurality of correlithm objects 104 from a first n-dimensional space 102 with a plurality of correlithm objects 104 in a second n-dimensional space 102. A node table 200 may be configured similar to the table 200 described in FIG. 2. Additional information for implementing or emulating a node 304 in hardware is described in FIG. 5.

Actors 306 serve as interfaces that allow a user device 100 to convert correlithm objects 104 in the correlithm object domain back to real world values or data samples. Actors 306 enable the user device 100 to convert from correlithm objects 104 into any suitable type of real world value. Actors 306 are configured to receive a correlithm object 104 (e.g. an output correlithm object 104), to determine a real world output value 326 based on the received correlithm object 104, and to output the real world output value 326. The real world output value 326 may be a different data type or representation of the original data sample. As an example, the real world input value 320 may be an image 301 of a person and the resulting real world output value 326 may be text 327 and/or an audio signal identifying the person. In one embodiment, actors 306 are configured to use actor tables 310 that link a plurality of correlithm objects 104 in an n-dimensional space 102 with a plurality of real world values. As an example, an actor table 310 may be configured with a first column 316 that lists correlithm objects 104 as output correlithm objects and a second column 318 that lists real world values. In other examples, actor tables 310 may be configured in any other suitable manner or may be implemented using any other suitable data structure. In some embodiments, one or more mapping functions may be employed to translate between a correlithm object 104 in an n-dimensional space and a real world output value 326. Additional information for implementing or emulating an actor 306 in hardware is described in FIG. 5.

A correlithm object processing system 300 uses a combination of a sensor table 308, a node table 200, and/or an actor table 310 to provide a specific set of rules that improve computer-related technologies by enabling devices to compare and to determine the degree of similarity between different data samples regardless of the data type and/or format of the data sample they represent. The ability to directly compare data samples having different data types and/or formatting is a new functionality that cannot be performed using conventional computing systems and data structures. Conventional systems require data samples to be of the same type and/or format in order to perform any kind of operation on the data samples. In some instances, some types of data samples are incompatible with each other and cannot be compared because there is no common format available. For example, conventional computers are unable to compare data samples of images with data samples of audio samples because there is no common format available. In contrast, a device implementing a correlithm object processing system uses a combination of a sensor table 308, a node table 200, and/or an actor table 310 to compare and perform operations using correlithm objects 104 in the correlithm object domain regardless of the type or format of the original data samples. The correlithm object processing system 300 uses a combination of a sensor table 308, a node table 200, and/or an actor table 310 as a specific set of rules that provides a particular solution to dealing with different types of data samples and allows devices to perform operations on different types of data samples using correlithm objects 104 in the correlithm object domain. In some instances, comparing data samples as correlithm objects 104 is computationally more efficient and faster than comparing data samples in their original format. Thus, using correlithm objects 104 to represent data samples provides increased flexibility and improved performance compared to using other conventional data structures. The specific set of rules used by the correlithm object processing system 300 go beyond simply using routine and conventional activities in order to achieve this new functionality and performance improvements.

In addition, correlithm object processing system 300 uses a combination of a sensor table 308, a node table 200, and/or an actor table 310 to provide a particular manner for transforming data samples between ordinal number representations and correlithm objects 104 in a correlithm object domain. For example, the correlithm object processing system 300 may be configured to transform a representation of a data sample into a correlithm object 104, to perform various operations using the correlithm object 104 in the correlithm object domain, and to transform a resulting correlithm object 104 into another representation of a data sample. Transforming data samples between ordinal number representations and correlithm objects 104 involves fundamentally changing the data type of data samples between an ordinal number system and a categorical number system to achieve the previously described benefits of the correlithm object processing system 300.

Figure 4:
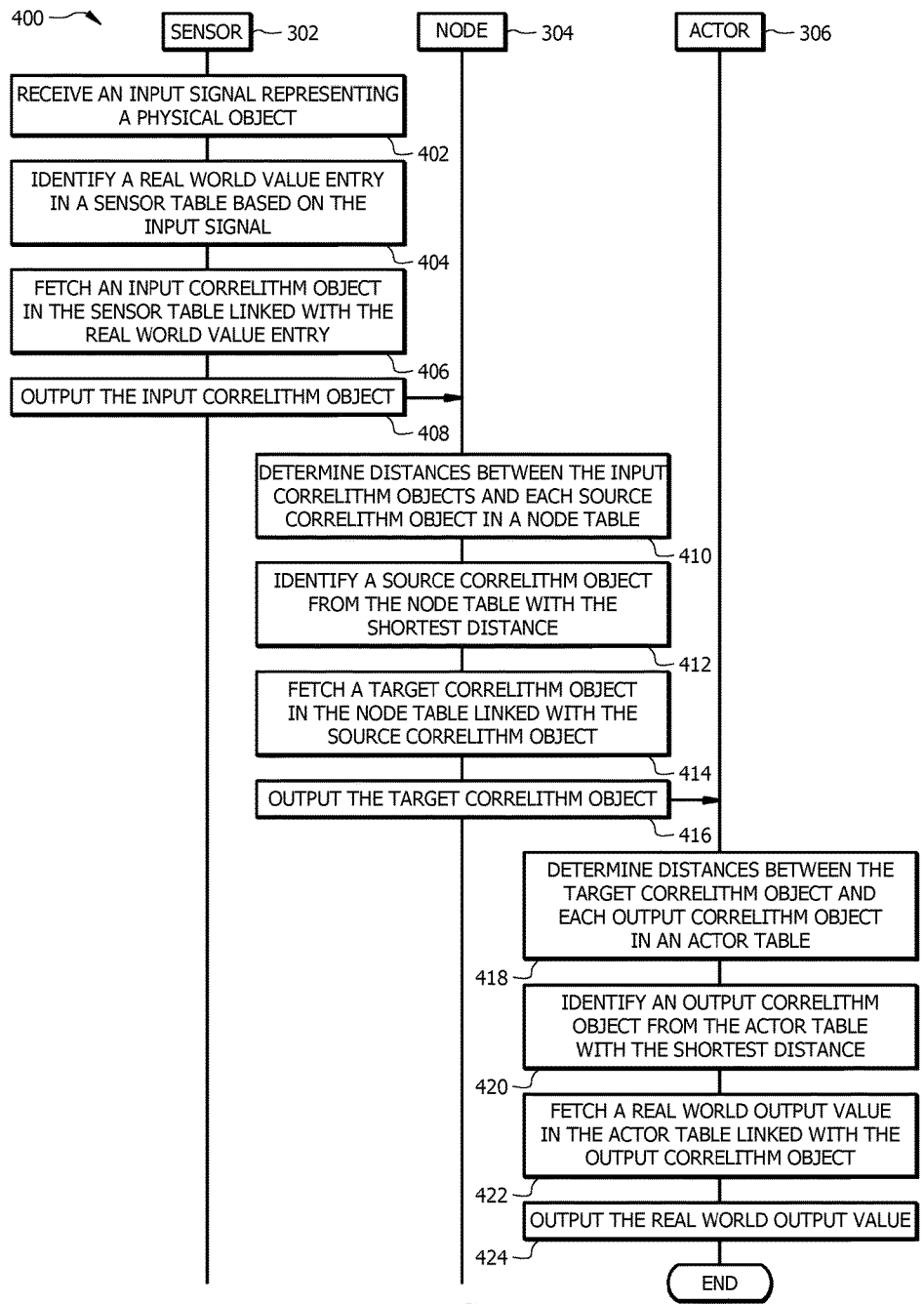
FIG. 4 is a protocol diagram of an embodiment of a correlithm object process flow.

FIG. 4 is a protocol diagram of an embodiment of a correlithm object process flow 400. A user device 100 implements process flow 400 to emulate a correlithm object processing system 300 to perform operations using correlithm object 104 such as facial recognition. The user device 100 implements process flow 400 to compare different data samples (e.g. images, voice signals, or text) are to each other and to identify other objects based on the comparison. Process flow 400 provides instructions that allows user devices 100 to achieve the improved technical benefits of a correlithm object processing system 300.

Conventional systems are configured to use ordinal numbers for identifying different data samples. Ordinal based number systems only provide information about the sequence order of numbers based on their numeric values, and do not provide any information about any other types of relationships for the data samples being represented by the numeric values such as similarity. In contrast, a user device 100 can implement or emulate the correlithm object processing system 300 which provides an unconventional solution that uses categorical numbers and correlithm objects 104 to represent data samples. For example, the system 300 may be configured to use binary integers as categorical numbers to generate correlithm objects 104 which enables the user device 100 to perform operations directly based on similarities between different data samples. Categorical numbers provide information about how similar different data sample are from each other. Correlithm objects 104 generated using categorical numbers can be used directly by the system 300 for determining how similar different data samples are from each other without relying on exact matches, having a common data type or format, or conventional signal processing techniques.

A non-limiting example is provided to illustrate how the user device 100 implements process flow 400 to emulate a correlithm object processing system 300 to perform facial recognition on an image to determine the identity of the person in the image. In other examples, the user device 100 may implement process flow 400 to emulate a correlithm object processing system 300 to perform voice recognition, text recognition, or any other operation that compares different objects.

At step 402, a sensor 302 receives an input signal representing a data sample. For example, the sensor 302 receives an image of person's face as a real world input value 320. The input signal may be in any suitable data type or format. In one embodiment, the sensor 302 may obtain the input signal in real-time from a peripheral device (e.g. a camera). In another embodiment, the sensor 302 may obtain the input signal from a memory or database.

At step 404, the sensor 302 identifies a real world value entry in a sensor table 308 based on the input signal. In one embodiment, the system 300 identifies a real world value entry in the sensor table 308 that matches the input signal. For example, the real world value entries may comprise previously stored images. The sensor 302 may compare the received image to the previously stored images to identify a real world value entry that matches the received image. In one embodiment, when the sensor 302 does not find an exact match, the sensor 302 finds a real world value entry that closest matches the received image.

At step 406, the sensor 302 identifies and fetches an input correlithm object 104 in the sensor table 308 linked with the real world value entry. At step 408, the sensor 302 sends the identified input correlithm object 104 to the node 304. In one embodiment, the identified input correlithm object 104 is represented in the sensor table 308 using a categorical binary integer string. The sensor 302 sends the binary string representing to the identified input correlithm object 104 to the node 304.

At step 410, the node 304 receives the input correlithm object 104 and determines distances 106 between the input correlithm object 104 and each source correlithm object 104 in a node table 200. In one embodiment, the distance 106 between two correlithm objects 104 can be determined based on the differences between the bits of the two correlithm objects 104. In other words, the distance 106 between two correlithm objects can be determined based on how many individual bits differ between a pair of correlithm objects 104. The distance 106 between two correlithm objects 104 can be computed using hamming distance or any other suitable technique. In another embodiment, the distance 106 between two correlithm objects 104 can be determined using a Minkowski distance such as the Euclidean or "straight-line" distance between the correlithm objects 104. For example, the distance 106 between a pair of correlithm objects 104 may be determined by calculating the square root of the sum of squares of the coordinate difference in each dimension.

At step 412, the node 304 identifies a source correlithm object 104 from the node table 200 with the shortest distance 106. A source correlithm object 104 with the shortest distance from the input correlithm object 104 is a correlithm object 104 either matches or most closely matches the received input correlithm object 104.

At step 414, the node 304 identifies and fetches a target correlithm object 104 in the node table 200 linked with the source correlithm object 104. At step 416, the node 304 outputs the identified target correlithm object 104 to the actor 306. In this example, the identified target correlithm object 104 is represented in the node table 200 using a categorical binary integer string. The node 304 sends the binary string representing to the identified target correlithm object 104 to the actor 306.

At step 418, the actor 306 receives the target correlithm object 104 and determines distances between the target correlithm object 104 and each output correlithm object 104 in an actor table 310. The actor 306 may compute the distances between the target correlithm object 104 and each output correlithm object 104 in an actor table 310 using a process similar to the process described in step 410.

At step 420, the actor 306 identifies an output correlithm object 104 from the actor table 310 with the shortest distance 106. An output correlithm object 104 with the shortest distance from the target correlithm object 104 is a correlithm object 104 either matches or most closely matches the received target correlithm object 104.

At step 422, the actor 306 identifies and fetches a real world output value in the actor table 310 linked with the output correlithm object 104. The real world output value may be any suitable type of data sample that corresponds with the original input signal. For example, the real world output value may be text that indicates the name of the person in the image or some other identifier associated with the person in the image. As another example, the real world output value may be an audio signal or sample of the name of the person in the image. In other examples, the real world output value may be any other suitable real world signal or value that corresponds with the original input signal. The real world output value may be in any suitable data type or format.

At step 424, the actor 306 outputs the identified real world output value. In one embodiment, the actor 306 may output the real world output value in real-time to a peripheral device (e.g. a display or a speaker). In one embodiment, the actor 306 may output the real world output value to a memory or database. In one embodiment, the real world output value is sent to another sensor 302. For example, the real world output value may be sent to another sensor 302 as an input for another process.

Figure 5:
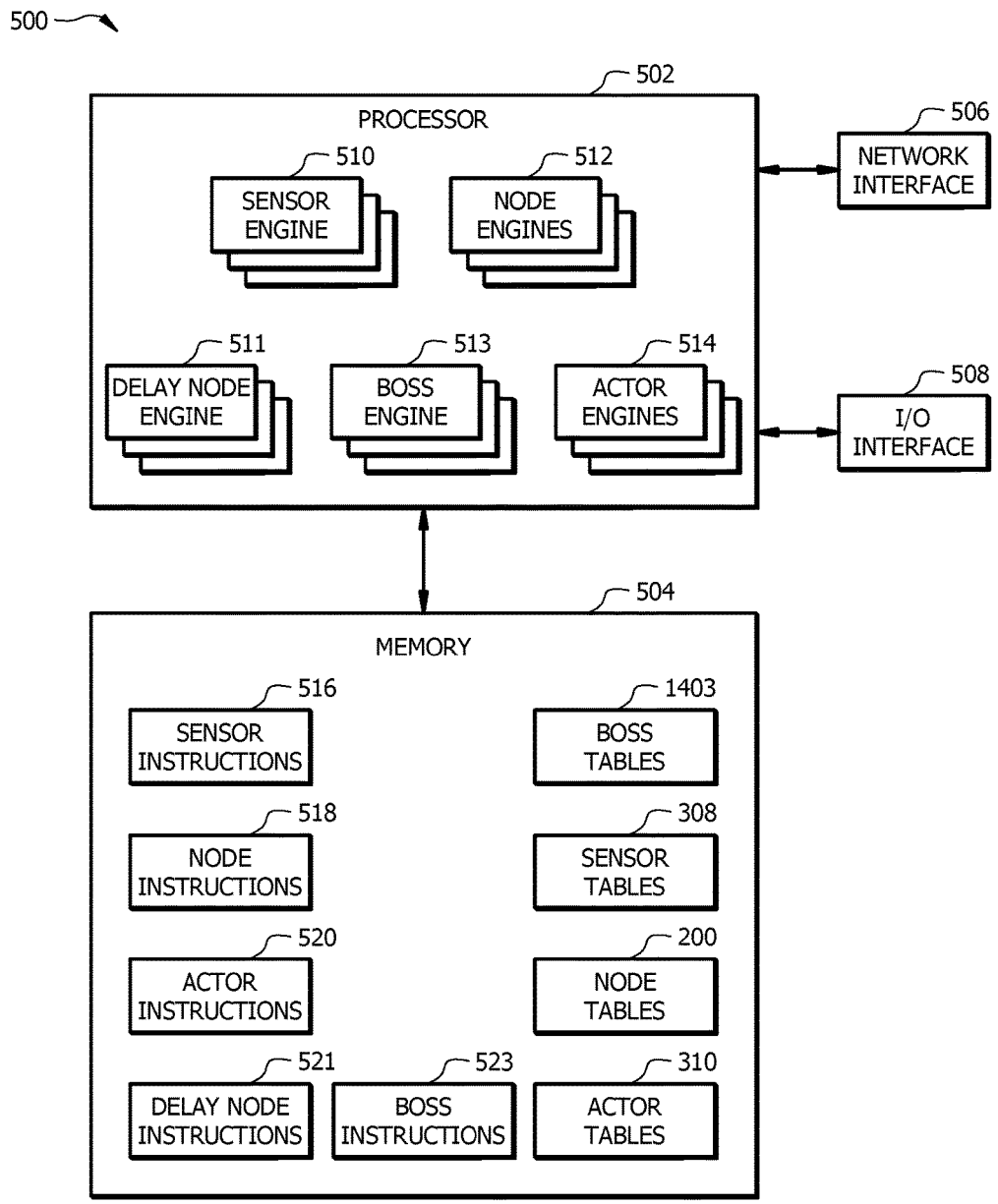
FIG. 5 is a schematic diagram of an embodiment a computer architecture for emulating a correlithm object processing system.

FIG. 5 is a schematic diagram of an embodiment a computer architecture 500 for emulating a correlithm object processing system 300 in a user device 100. The computer architecture 500 comprises a processor 502, a memory 504, a network interface 506, and an input-output (I/O) interface 508. The computer architecture 500 may be configured as shown or in any other suitable configuration.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), graphics processing units (GPUs), or digital signal processors (DSPs). The processor 502 may be a programmable logic device, a microcontroller, a microprocessor, or any suitable combination of the preceding. The processor 502 is communicatively coupled to and in signal communication with the memory 204. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement sensor engines 510, delay node engines 511, node engines 512, boss engines 513, and actor engines 514. In an embodiment, the sensor engines 510, the node engines 512, and the actor engines 514 are implemented using logic units, FPGAs, ASICs, DSPs, or any other suitable hardware.

In one embodiment, the sensor engine 510 is configured to receive a real world value 320 as an input, to determine a correlithm object 104 based on the real world value 320, and to output the correlithm object 104. Examples of the sensor engine 510 in operation are described in FIGS. 4 and 11.

In one embodiment, the node engine 512 is configured to receive a correlithm object 104 (e.g. an input correlithm object 104), to determine another correlithm object 104 based on the received correlithm object 104, and to output the identified correlithm object 104 (e.g. an output correlithm object 104). The node engine 512 is also configured to compute distances between pairs of correlithm objects 104. Examples of the node engine 512 in operation are described in FIGS. 4, 6-12, 14, 15A, 15B, and 18.

In one embodiment, the delay node engine 511 is configured to receive a correlithm object 104 and then output the correlithm object 104 after a predetermined amount of time has elapsed. In other words, the delay node engine 511 is configured to provide delays or delay lines for a correlithm object processing system. Examples of the delay node engine 511 in operation are described in FIGS. 6-11.

In one embodiment, the boss engine 513 is configured to control and synchronize components within a correlithm object processing system. The boss engine 513 is configured to send commands (e.g. execute commands or output commands) to components within a correlithm object processing system to control their operation. Examples of the boss engine 513 in operation are described in FIGS. 14-17.

In one embodiment, the actor engine 514 is configured to receive a correlithm object 104 (e.g. an output correlithm object 104), to determine a real world output value 326 based on the received correlithm object 104, and to output the real world output value 326. Examples of the actor engine 514 in operation are described in FIGS. 4 and 11.

The memory 504 comprises one or more non-transitory disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM). The memory 504 is operable to store sensor instructions 516, node instructions 518, actor instructions 520, sensor tables 308, node tables 200, actor tables 310, and/or any other data or instructions. The sensor instructions 516, the node instructions 518, the delay node instructions 521, the boss instructions 523, and the actor instructions 520 comprise any suitable set of instructions, logic, rules, or code operable to execute the sensor engine 510, node engine 512, the delay node engine 511, the boss engine 513, and the actor engine 514, respectively.

The sensor tables 308, the node tables 200, and the actor tables 310 may be configured similar to the sensor tables 308, the node tables 200, and the actor tables 310 described in FIG. 3, respectively. The boss table 1403 generally comprises a list of components within a correlithm object processing system. Additional information about boss tables 1403 is described in FIGS. 14-17.

The network interface 506 is configured to enable wired and/or wireless communications. The network interface 506 is configured to communicate data with any other device or system. For example, the network interface 506 may be configured for communication with a modem, a switch, a router, a bridge, a server, or a client. The processor 502 is configured to send and receive data using the network interface 506.

The I/O interface 508 may comprise ports, transmitters, receivers, transceivers, or any other devices for transmitting and/or receiving data with peripheral devices as would be appreciated by one of ordinary skill in the art upon viewing this disclosure. For example, the I/O interface 508 may be configured to communicate data between the processor 502 and peripheral hardware such as a graphical user interface, a display, a mouse, a keyboard, a key pad, and a touch sensor (e.g. a touch screen).

FIGS. 6-11 generally describe embodiments for how delay nodes and delay lines may be emulated or implemented in a correlithm object processing system 300 by a device 100. Using delay nodes and delay lines allows the device 100 to introduce delays into a correlithm object processing system 300. These delays can be used to control data flow within an asynchronous or synchronous correlithm object processing system. Examples of an asynchronous or synchronous correlithm object processing system are described in FIGS. 12-17. Controlling data flow improves the speed and efficiency of the device 100 when implementing a correlithm object processing system 300.

Figures 6, 7A, 7B:
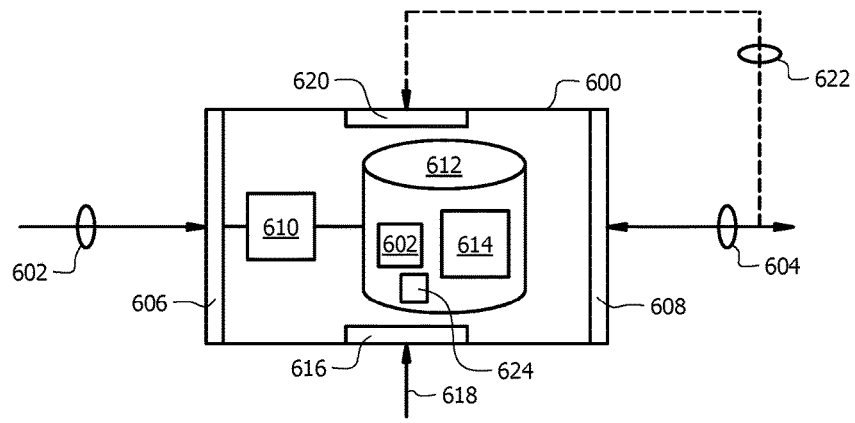
FIG. 6 is a schematic diagram of an embodiment of a correlithm object delay node for a correlithm object processing system.
FIG. 7A is an embodiment of a table demonstrating a delay operation for correlithm object delay node.
FIG. 7B is an embodiment of a table demonstrating a state hold delay operation for correlithm object delay node.

FIG. 6 illustrates one embodiment of a correlithm object delay node 600 that receives an input correlithm object 602 and communicates an output correlithm object 604 after a delay time, as described in detail below. Delay node 600 includes an input interface 606, output interface 608, processor 610, and memory 612. Processor 610 and memory 612 may be the same or different than processor 502 and memory 504, respectively, described above. In some embodiments, memory 612 includes correlithm object values 614 that are used to validate input correlithm object 602, as described in detail below. In some embodiments, delay node 600 further includes a clock input interface 616 that receives a clock signal 618 that can be used to control the delay time between receiving the input correlithm object 602 and communicating the output correlithm object 604. For example, a delay node 600 may be configured to emulate one digital clock cycle. In another example, the delay node 600 may be configured to emulate more than one digital clock cycle. For instance, the delay node 600 may emulate a delay of two clock cycles, five clock cycles, or any other suitable number of clock cycles. In some embodiments, delay node 600 further includes a state input interface 620 that receives a feedback signal 622 to implement a state hold delay operation, as described in further detail below.

In operation, input interface 606 of correlithm object delay node 600 receives input correlithm object 602 at a first time (e.g., T0) and communicates it as an output correlithm object 605 at a second time (e.g., T1) later than the first time. In one embodiment, delay node 600 validates input correlithm object 602 to confirm that it is not noise or some other spurious signal by comparing it against a plurality of correlithm object values 614 stored in memory 612. Correlithm object values 614 represent correlithm objects that are predetermined to be valid inputs or outputs within the correlithm object processing system. For example, these may be correlithm objects that have been processed by other nodes within the correlithm object processing system. In another example, these may be correlithm objects that have been determined to represent real-world data by a sensor 302. To determine the validity of an input correlithm object 602, processor 610 determines the Hamming distance between input correlithm object 602 and each of the correlithm object values 614 stored in memory 612. If any of the determined Hamming distances are within a predetermined threshold of validity, then the input correlithm object 602 is determined to be valid and is stored in memory 612. By first determining that the input correlithm object 602 is valid, delay node 600 can avoid storing and communicating noise or some other spurious signal that is not, in fact, a valid input.

The predetermined threshold of validity can be, for example, a predetermined number of bits that can be different between the input correlithm object 602 and a corresponding one of the correlithm object values 614 while still indicating that the n-dimensional space 102 between input correlithm object 602 and that correlithm object value 614 is small enough to conclude with a high degree of likelihood that the input correlithm object 602 is that correlithm object value 614. For example, if the input correlithm object 602 and the correlithm object values 614 are each 64-bit digital values, then a Hamming distance of up to 8 bits signifies to a high degree of probability that the input correlithm object 602 and a corresponding correlithm object value 614 are the same. Similarly, if the input correlithm object 602 and the correlithm object values 614 are each 128-bit digital values, then a Hamming distance of up to 30 bits signifies to a high degree of probability that the input correlithm object 602 and a corresponding correlithm object value 614 are the same.

In some embodiments, the delay node 600 may be configured to receive input correlithm object 602 at a first time (e.g., T0) and communicate it as an output correlithm object 605 at a second time (e.g., T1) later than the first time without determining whether the input correlithm object 602 is a predetermined valid input. For example, the delay node 600 may communicate a received correlithm object 602 as an output correlithm object 605 after a predetermined amount of delay regardless of the correlithm object's value.

Delay node 600 determines an appropriate delay between the time at which it receives input correlithm object 602 and the time it communicates it as output correlithm object 604. In one embodiment, the correlithm object delay node 600 communicates output correlithm object 604 asynchronously, such as by communicating output correlithm object 604 as soon as possible, or according to the schedules of other nodes rather than according to a synchronized clock. In another embodiment, the delay node 600 communicates output correlithm object 604 according to synchronized clock signal 618 that may be associated with one or more Boss nodes, as explained in further detail below. In another embodiment, the delay node 600 communicates output correlithm object 604 according to a digital clock signal generated or provided by the delay node 600. In another embodiment, the delay node 600 communicates output correlithm object 604 according to a digital clock signal provided by a processor (e.g. processor 502).

In one embodiment, delay node 600 receives output correlithm object 604 as a feedback signal 622 at state input interface 620. The output correlithm object 604 is stored as state information 624 in memory 612. This state information 624 is used to implement a state hold delay operation as described below in conjunction with FIG. 7B.

The correlithm object delay node 600 provides technical advantages in the implementation of either synchronous or asynchronous logic. With regard to synchronous logic, the delay node 600 helps to ensure that any changes to logic signals throughout a circuit system begin at the same time, at regular intervals, synchronized by a clock signal 618. Clock signal 618 may be a sequence of repetitive pulses generated by an electronic oscillator or clock generator. One technical problem with implementing synchronous digital circuitry is that the logic gates which perform the operations on data require a finite amount of time to respond to changes to their inputs. This is referred to as propagation delay. The interval between clock pulses should be long enough so that all the logic gates have time to respond to the changes and their outputs "settle" to stable logic values, before the next clock pulse occurs. The delay node 600 helps to ensure that the state of a synchronous circuit changes on clock pulses. At each cycle, the next state can be determined by the current state and the value of the input signals when the clock pulse occurs, as described in greater detail below. This promotes stability and reliability in the operation of synchronous digital circuits.

With regard to asynchronous logic, the outputs of the circuit change directly in response to changes in inputs and the speed of a logic gate device is potentially limited only by the propagation delays of the logic gates that are used. However, asynchronous logic can be more difficult to design and is subject to problems not encountered in synchronous designs. The main problem is that digital memory elements are sensitive to the order that their input signals arrive. For example, if two signals arrive at a logic gate at roughly the same time, which state the circuit goes into can depend on which signal gets to the gate first. Therefore, the circuit can go into the wrong state, depending on small differences in the propagation delays of the logic gates. This is called a race condition. Delay node 600 helps to ensure that input signals arrive at logic gates in the proper order, thereby solving a technical problem inherent in asynchronous digital circuitry.

FIG. 7A illustrates a table 700 demonstrating a delay operation for correlithm object delay node 600. Table 700 includes a time column 702, an input column 704, and an output column 706. Rows 708 are filled with an example to demonstrate the operation of delay node 600. According to the illustrated example, delay node 600 receives an input correlithm object 602 signified as X0 at time T0. After a time delay (e.g., one clock pulse), at time T1, delay node 600 communicates correlithm object 602 signified as X0 as output correlithm object 604. A new input correlithm object 602 is not yet received at time T1 or by time T2. Thus, delay node 600 maintains its most recent input correlithm object 602 signified as X0 at times T1 and T2. Because no new input correlithm object 602 is received by time T1, delay node 600 continues to communicate output correlithm object 602 signified as X0 at time T2. Delay node 600 then receives a new input correlithm object 602 signified as X1 at time T3, and continues to communicate output correlithm object 602 signified as X0 at time T3. After a time delay (e.g., one clock pulse), at time T4, delay node 600 communicates the correlithm object 602 signified as X1 as output correlithm object 604. A new input correlithm object 602 is not yet received at time T4 or by time T5. Because no new input correlithm object 602 is received by time T4, delay node 600 continues to communicate output correlithm object 602 signified as X1 at time T5. The operation of delay node 600 can be expanded beyond the times T0-T5 illustrated in table 700.

FIG. 7B illustrates a table 750 demonstrating an example state hold delay operation for correlithm object delay node 600 utilizing feedback signal 722. Table 750 includes a time column 752, an input column 754, a state input column 756, and an output column 758. Rows 760 are filled with an example to demonstrate the operation of delay node 600. According to the illustrated example, delay node 600 receives an input correlithm object 602 signified as X0 at time T0. After a time delay (e.g., one clock pulse), at time T1, delay node 600 communicates correlithm object 602 signified as X0 as output correlithm object 604. A new input correlithm object 602 is not yet received at time T1 or by time T2. Thus, no input correlithm object 602 is indicated in column 754 for times T1 and T2. Moreover, output correlithm object 604 signified by X0 is received as feedback signal 622 at state input interface 620 at time T2 and stored in memory 612. In the absence of an input correlithm object 602 in column 754 for time T1, the correlithm object signified by X0 in state input column 756 controls the output correlithm object 604 communicated by delay node 600 at time T2. Delay node 600 receives a new input correlithm object 602 signified as X1 at time T3. Also at time T3, state input column 756 continues to store a correlithm object signified as X0. If the input interface 606 receives a new input correlithm object 602, as it does at time T3, then that correlithm object 602 appears as the output correlithm object 604 a delay time later (e.g., one clock pulse), as illustrated in table 750 for time T4, regardless of what correlithm object value appears in the state input column 756. A new input correlithm object 602 is not yet received at time T4 or by time T5. Thus, no input correlithm object 602 is indicated in input column 754 for times T4 and T5. Moreover, output correlithm object 604 signified as X1 is received as feedback signal 622 at state input interface 620 at time T5 and stored in memory 612. In the absence of an input correlithm object 602 in column 754 for time T4, the correlithm object 602 signified as X1 in state input column 756 controls the output correlithm object 604 communicated by delay node 600 at time T5.

FIG. 8 illustrates one embodiment of a correlithm object delay line 800 that includes multiple stages (e.g., three) of correlithm object delay nodes 600A, 600B, and 600C communicatively coupled to each other in series. Each correlithm object delay node 600A-600C of delay line 800 is described in greater detail above with respect to FIGS. 6 and 7A-7B. First correlithm object delay node 600A receives an input correlithm object 602 and communicates an output correlithm object 604 an appropriate delay time later. This output correlithm object 604 of the first correlithm object delay node 600A is then received by second correlithm object delay node 600B as an input correlithm object 602 and communicated as an output correlithm object 604 an appropriate delay time later. The output correlithm object 604 of second delay node 600B is received by third correlithm object delay node 600C as an input correlithm object 602 and communicated as an output correlithm object 604 an appropriate delay time later. In one embodiment, one or more of the correlithm object delay nodes 600A-600C communicates its output correlithm object 604 as a feedback signal 622 back to itself to implement, for example, a state hold delay operation, as described above. Although FIG. 8 illustrates a three-stage correlithm object delay line 800, it should be understood that correlithm object delay line 800 can be implemented with two or more correlithm object delay nodes 600 communicatively coupled in series.

FIG. 9 illustrates a table 900 demonstrating an example delay operation for correlithm object delay line 800. Table 900 includes a time column 902, an input column 904 and an output column 906 for the first correlithm object delay node 600A, an input column 908 and an output column 910 for the second correlithm object delay node 600B, and an input column 912 and an output column 914 for the third correlithm object delay node 600C. Rows 916 are filled with an example to demonstrate the operation of delay line 800. In operation, the correlithm objects signified as X0-X5 propagate through and among each correlithm object delay node 600A-600C according to suitable time delays.

For example, with respect to the correlithm object signified as X0, correlithm object delay node 600A receives it as an input correlithm object 602A at time T0 and communicates it as output correlithm object 604A after a suitable delay (e.g., one clock pulse) at time T1; correlithm object delay node 600B receives it as an input correlithm object 602B at time T2 and communicates it as output correlithm object 604B after a suitable delay at time T3; and correlithm object delay node 600C receives it as an input correlithm object 602C at time T4 and communicates it as output correlithm object 604C after a suitable delay at time T5.

With respect to the correlithm object signified as X1, the correlithm object delay node 600A receives it as an input correlithm object 602A at time T1 and communicates it as output correlithm object 604A after a suitable delay at time T2; the correlithm object delay node 600B receives it as an input correlithm object 602B at time T3 and communicates it as output correlithm object 604B after a suitable delay at time T4; and correlithm object delay node 600C receives it as an input correlithm object 602C at time T5 and communicates it as output correlithm object 604c after a suitable delay, although it is not illustrated in table 900.

With respect to the correlithm object signified as X2, correlithm object delay node 600A receives it as an input correlithm object 602A at time T2 and communicates it as output correlithm object 604A after a suitable delay at time T3; and correlithm object delay node 600B receives it as an input correlithm object 602B at time T4 and communicates it as output correlithm object 604B after a suitable delay at time T5.

With respect to the correlithm object signified as X3, the correlithm object delay node 600A receives it as an input correlithm object 602A at time T3 and communicates it as output correlithm object 604A after a suitable delay at time T4; and correlithm object delay node 600B receives it as an input correlithm object 602B at time T5 and communicates it as output correlithm object 604B after a suitable delay, although it is not illustrated in table 900.

With respect to the correlithm object signified as X4, the correlithm object delay node 600A receives it as an input correlithm object 602A at time T4 and communicates it as output correlithm object 604A after a delay at time T5.

With respect to the correlithm object signified as X5, the correlithm object delay node 600A receives it as an input correlithm object 602A at time T5 and communicates it as output correlithm object 604A after a suitable delay, although it is not illustrated in table 900.

Figure 10:
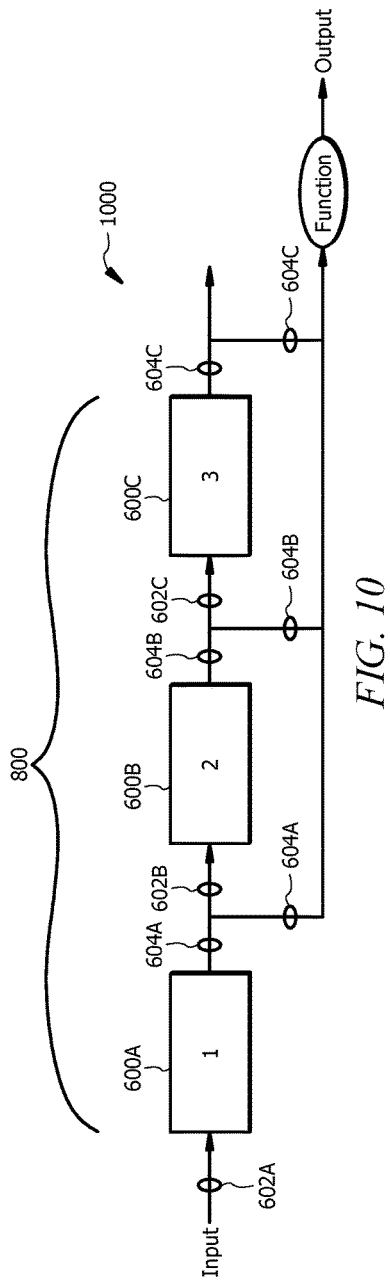
FIG. 10 is a schematic diagram of an embodiment of a finite impulse response filter 1000 implemented using correlithm object delay nodes.

FIG. 10 illustrates one embodiment of a finite impulse response (FIR) filter 1000 implemented using delay nodes 600A-600C arranged in series as a correlithm object delay line 800. In signal processing, a finite impulse response filter is a filter whose impulse response (or response to any finite length input) is of finite duration, because it settles to zero in finite time. The filter 1000 applies a suitable function on the time delayed outputs of each stage of the correlithm object delay line 800 (e.g., f (1, 2, 3)). Examples of functions include, but are not limited to, an equals function, a summation function, a multiplication function, a subtraction function, a division function, or any other suitable type of function. In some embodiments, the filter 1000 is configured to apply any suitable number of functions to the outputs of the delay nodes 600A-600C.

Figure 11:
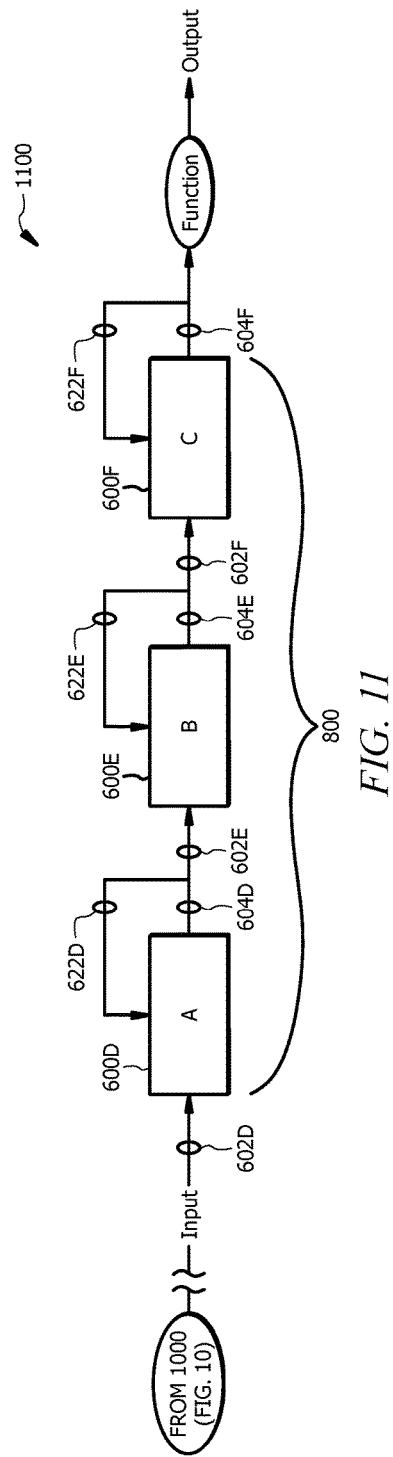
FIG. 11 is a schematic diagram of an embodiment of an infinite impulse response filter implemented using correlithm object delay nodes.

FIG. 11 illustrates one embodiment of an infinite impulse response (IIR) filter 1100 implemented using correlithm object delay nodes 600D-600F arranged in series as a correlithm object delay line 800, where each delay node 600 has a feedback signal 622. The presence of feedback in the topology of a discrete-time filter generally creates an IIR response. IIR filter 1100 has an impulse response that does not become exactly zero past a certain point, but continues indefinitely. This is in contrast to a FIR filter 1000 in which the impulse response does because zero after a finite duration. The IIR filter 1100 applies a suitable function on the time delayed outputs of each stage of the correlithm object delay line 800 (e.g., f (A, B, C)). In a particular embodiment, the output of a FIR filter 1000 may be input to the IIR filter 1100 such that it applies a suitable function, such as f (1, 2, 3, A, B, C), to generate its output. In another embodiment, the IIR filter 1100 may be independent from FIR filter 1000. For example, the IIR filter 1100 may be configured to receive an input from another component instead of the FIR filter 1000. By implementing FIR filter 1000 and IIR filter 1100 using correlithm object delay nodes 600 arranged in a correlithm object delay line 800, these filters can derive the benefit of using correlithm objects 104 to represent data, which, among other things as described above, facilitates noise immunity, stability, and data accuracy to the system. In some embodiments, the filter 1100 is configured to apply any suitable number of functions to the outputs of the delay nodes 600D-600F.

Figure 12:
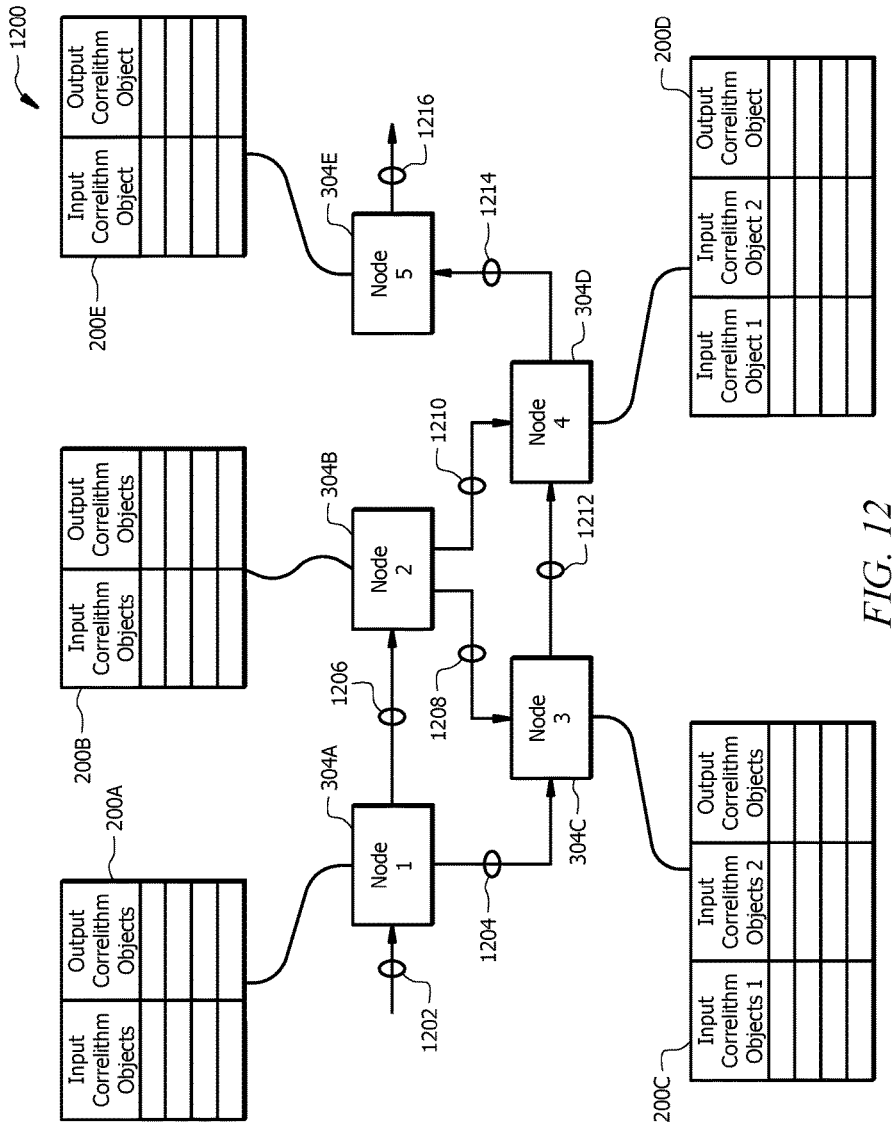
FIG. 12 is schematic diagram of an embodiment of an asynchronous correlithm object processing system.
Figure 13:
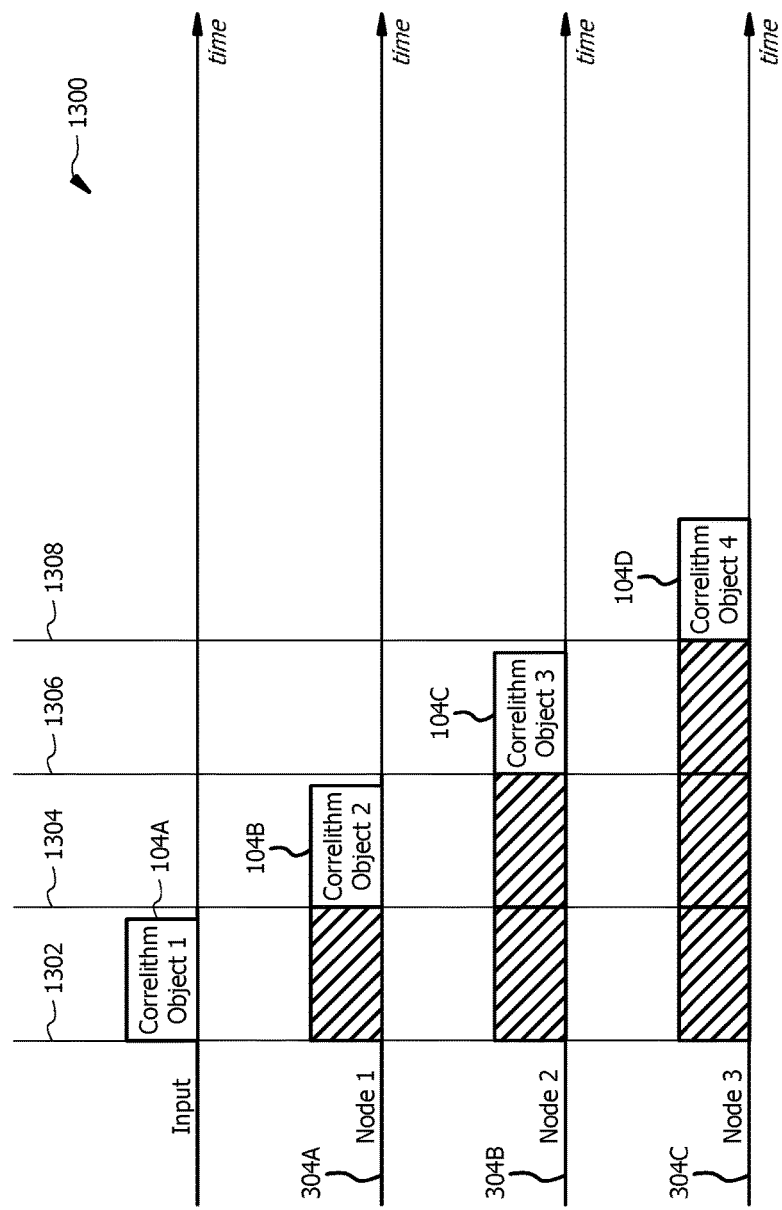
FIG. 13 is an embodiment of a timing diagram for an asynchronous correlithm object processing system.

FIGS. 12-13 generally describe an embodiment of an asynchronous correlithm object processing system. In one embodiment, components (e.g. sensors 302, nodes 304, delay nodes 600, and actors 306) in an asynchronous correlithm object processing system are configured to provide an output value in response to receiving an input value. In this configuration, the components are not governed or synchronized by a control signal or clock signal. For example, when a node 304 in an asynchronous correlithm object processing system receives an input correlithm object 104, the node 304 will output an output correlithm object 104 as soon as the output correlithm object 104 has been determined without waiting for a triggering event or signal that synchronizes the node 304 with the other components of the asynchronous correlithm object processing system.

Using correlithm objects 104 in an asynchronous correlithm object processing system provides a layer of noise immunity for operations performed by the device 100. For example, a node 304 in the correlithm object processing system 300 is able to use the hamming distance between a received correlithm object 104 and valid correlithm object entries in a node table 200 to identify a correct correlithm object value even in the presence of bit errors. For example, a received correlithm object 104 may have one or more bit errors (i.e. incorrect bit values) that changes the original correlithm object value. In this example, a node 304 is still able to correctly identify the original correlithm object value despite the bit errors. This ability to correctly identify the original correlithm object value despite the bit errors is a technical advantage over conventional systems that are unable to resolve signals with bit errors.

FIG. 12 is schematic diagram of an embodiment of an asynchronous correlithm object processing system 1200 that comprises a first node 304A, a second node 304B, a third node 304C, a fourth node 304D, and a fifth node 340E. In other embodiments, the asynchronous correlithm object processing system 1200 may comprise any other suitable type and/or number of components. The components in the asynchronous correlithm object processing system 1200 may also be configured in any other suitable configuration.

In one embodiment, nodes 304A-304E are configured to detect when a correlithm object 104 is loaded into their respective buffer. For example, the first node 304 may be configured to set a flag (e.g. a flag bit) that indicates that a new correlithm object 104 has been loaded in its buffer and is ready for processing.

The first node 304A is configured to receive an input correlithm object 1202. The input correlithm object 1202 may be received from a sensor 302, a node 304, a delay node 600, or any other suitable component. The first node 304A is configured to determine an output correlithm based on the input correlithm object 1202 and to output the output correlithm object to the second node 304B (shown as correlithm object 1206) and the third node 304C (shown as correlithm object 1204). As an example, the first node 304A may use node table 200A to identify an output correlithm object 104 based on the received input correlithm object 104. The first node 304A may compute the hamming distance between the input correlithm object 1202 and input correlithm object entries in the node table 200A. The first node 304A may identify the input correlithm object from the node table 200A with the smallest hamming distance and fetch the output correlithm object in the node table 200A linked with the identified input correlithm object. In one embodiment, the input correlithm objects and the output correlithm objects in the node table 200A are members of the same n-dimensional space 102. In another embodiment, the input correlithm objects and the output correlithm objects in the node table 200A are members of the different n-dimensional spaces 102.

The second node 304B is configured to receive an input correlithm object 1206 from the first node 304A and to determine an output correlithm object based on the input correlithm object 1206. The second node 304B is configured to output the output correlithm object to the third node 304C (shown as correlithm object 1208) and to the fourth node 304D (shown as correlithm object 1210). For example, the second node 304B may use node table 200B to identify an output correlithm object 104 based on the received input correlithm object 1206 using a process similar to the process described for the first node 304A.

The third node 304C is configured to receive a first input correlithm 1204 from the first node 304A and a second input correlithm 1208 from the second node 304B. The third node 304C is configured to determine an output correlithm object based on the first input correlithm object 104 and the second correlithm object 104A and to output the output correlithm object to the fourth node 304D (shown as correlithm object 1212). For example, the third node 304C may use node table 200C to identify an output correlithm object 104 based on the first input correlithm object 1204 and the second correlithm object 1208. As an example, the third node 304C may compute the hamming distance between the first input correlithm object 1204 and a first set of input correlithm object entries in the node table 200C. The third node 304C may identify a first input correlithm object from the node table 200C with the smallest hamming distance. The third node 304C may then compute the hamming distance between the second input correlithm object 1208 and a second set of input correlithm object entries in the node table 200C. The third node 304C may identify a second input correlithm object from the node table 200C with the smallest hamming distance. The third node 304C may then fetch the output correlithm object in the node table 200 linked with the identified input correlithm objects.

In this example, the third node 304C is unable to determine a valid output correlithm object 104 until it receives input correlithm objects 1204 and 1208 from the first node 304A and the second node 304B, respectively. In one embodiment, the third node 304C may be configured to refrain from providing an output correlithm object until both input correlithm objects have been received. In another embodiment, the output of the third node 304C may be unknown or invalid until both input correlithm objects have been received.

The fourth node 304D is configured to receive a first input correlithm 1210 from the second node 304B and a second input correlithm 1212 from the third node 304C. The fourth node 304D is configured to determine an output correlithm object based on the first input correlithm object 1210 and the second correlithm object 1212 and to output the output correlithm object to the fifth node 304E (shown as correlithm object 1214). For example, the fourth node 304D may use node table 200D to identify an output correlithm object 104 based on the first input correlithm object 104 using a process similar to the process described for the third node 304C.

In this example, the fourth node 304D is configured similar to the third node 304C in that the fourth node 304D is unable to determine a valid output correlithm object until it receives input correlithm objects 1210 and 1212 from the second node 304B and the third node 304C, respectively. In one embodiment, the fourth node 304D may be configured to refrain from providing an output correlithm object until both input correlithm objects have been received. In another embodiment, the output of the fourth node 304D may be unknown or invalid until both input correlithm objects 104 have been received.

The fifth node 304E is configured to receive an input correlithm object 1214 from the fourth node 304D and to determine an output correlithm 104 based on the input correlithm object 1214. The fifth node 304E is configured to output the output correlithm object 1216. For example, the fifth node 304E may use node table 200E to identify an output correlithm object 104 based on the received input correlithm object 1214 using a process similar to the process described for the first node 304A. The output correlithm object 104 may be sent to a node 304, a delay node 600, an actor 306, a peripheral device, or any other suitable component.

FIG. 13 is an embodiment of a timing diagram 1300 for an asynchronous correlithm object processing system 1200. In this example, the timing diagram 1300 illustrates input and output values over time for the first node 304A, the second node 304B, and third node 304C from the asynchronous correlithm object processing system 1200 described in FIG. 12.

At time 1302, a first correlithm object 104A (e.g. correlithm object 1202) is received at the input of the first node 304A. Prior to receiving the first correlithm object 104A, the initial outputs of the first node 304A, the second node 304B, and the third node 304C may be unknown or invalid.

At time 1304, the first node 304A outputs a second correlithm object 104B (e.g. correlithm objects 1204 and 1206) in response to receiving the first correlithm object 104A. The first node 304A may determine or compute the second correlithm object 104B using any suitable technique. At this time, the outputs for the second node 304B and the third node 304C are still unknown or invalid because these nodes have not received input correlithm objects yet.

At time 1306, the second node 304B outputs a third correlithm object 104C (e.g. correlithm object 1208) in response to receiving the second correlithm object 104B. The second node 304B may determine or compute the third correlithm object 104C using any suitable technique. At this time, the output for the third node 304C is still unknown or invalid because the third node 304C needs an input correlithm object from both the first node 304A and the second node 304B to generate an output correlithm object. The third node 304C is still waiting to receive an input correlithm object from the second node 304B.

At time 1308, the third node 304C outputs a fourth correlithm object 104D (e.g. correlithm object 1212) in response to receiving the second correlithm object 104B from first node 304A and the third correlithm object 104C from the second node 304B.

In one embodiment, nodes 304A-304C may hold their current output value until a new input correlithm object is received. In another embodiment, the output values of nodes 304A-304C may not longer be valid after a predetermined amount of time. In other words, the output values of nodes 304A-304C may only be valid for a predetermined amount of time.

FIGS. 14-17 generally describe an embodiment of a synchronous correlithm object processing system. In one embodiment, components (e.g. sensors 302, nodes 304, a delay node 600, and actors 306) in a synchronous correlithm object processing system are configured to provide an output value in response to detecting a triggering event, for example, a control signal or digital clock signal. For example, when a node 304 in a synchronous correlithm object processing system receives an input correlithm object 104, the node 304 outputs an output correlithm object 104 in response to a triggering event rather than automatically outputting the output correlithm object 104 once it has been determined like in an asynchronous correlithm object processing system. The triggering event is an event or signal that is used to synchronize the components of the synchronous correlithm object processing system. An example of a synchronous correlithm object processing system in operation is described in FIG. 15.

Emulating or implementing a synchronous correlithm object processing system allows a device 100 to implement a correlithm object processing system 300 using parallel processing. Parallel processing provides a technical advantage by increasing the processing speed and efficiency of the device 100 when performing operations in the correlithm object domain. With parallel processing, components in the correlithm object processing system are able to work in parallel which reduces the amount of time required to perform operations and increase the throughput of the device 100. Device 100 may be configured with any suitable hardware and/or software configuration for scheduling and implementing parallel processing capabilities as would be appreciated by one of ordinary skill in the art. For example, device 100 may be configured with hardware for implementing master-slave parallel processing, symmetric multiprocessing, distributed computing, cluster computing, massively parallel processing, or any other suitable type of parallel processing.

In addition, using correlithm objects 104 in a synchronous correlithm object processing system provides a layer of noise immunity for operations performed by the device 100. For example, a node 304 in the correlithm object processing system 300 is able to use the hamming distance between a received correlithm object 104 and valid correlithm objects in a node table 200 to identify a correct correlithm object value even in the presence of bit errors. For example, a received correlithm object 104 may have one or more bit errors (i.e. incorrect bit values) that changes the original correlithm object value. In this example, a node 304 is still able to correctly identify the original correlithm object value despite the bit errors. This ability to correctly identify the original correlithm object value despite the bit errors is a technical advantage over conventional systems that are unable to resolve signals with bit errors.

Figure 14:
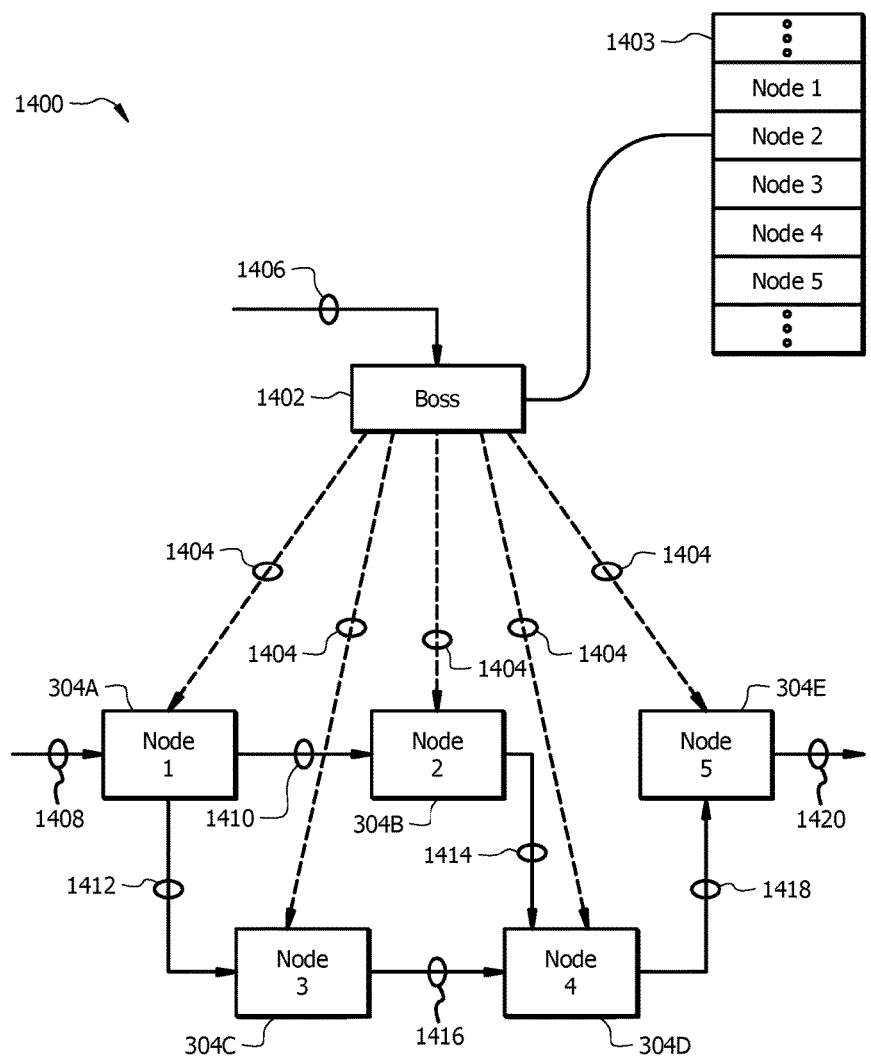
FIG. 14 is a schematic diagram of an embodiment of a synchronous correlithm object processing system.

FIG. 14 is a schematic diagram of an embodiment of a synchronous correlithm object processing system 1400 that comprises a boss 1402, a first node 304A, a second node 304B, a third node 304C, a fourth node 304D, and a fifth node 340E. In other embodiments, the synchronous correlithm object processing system 1400 may comprise any other suitable type and/or number of components. The components in the synchronous correlithm object processing system 1400 may also be configured in any other suitable configuration.

The boss 1402 is generally configured to control the operation of the synchronous correlithm object processing system 1400 by sending commands to every component to control the timing of when different operations are performed. For example, in a first phase, the boss 1402 sends commands 1404 (e.g. execute commands) to every component that triggers the components execute an operation on one or more correlithm objects 104 or real world values. In a second phase, the boss 1402 sends commands 1404 (e.g.

output commands) to every component that triggers the components to provide an output (e.g. a correlithm object 104 or a real world value). The boss 1402 may repeat the process of sending execute commands and output commands to control and synchronize the components in the synchronous correlithm object processing system 1400.

The boss 1402 is configured to store and/or access a boss table 1403 that identifies the components in the synchronous correlithm object processing system 1400. For example, the boss table 1403 may be stored in memory 504 described in FIG. 5. In one embodiment, the boss table 1403 is a data structure (e.g. a table or an data array) that identifies the components in the synchronous correlithm object processing system 1400. The boss table 1403 may use any suitable identifier for identifying the components in the synchronous correlithm object processing system 1400. In some embodiments, the boss table 1403 may comprise additional information linked with the components in the synchronous correlithm object processing system 1400. For example, the boss table 1403 may comprise flags that indicate whether a particular command (e.g. an execute command or an output command) has been sent to a component. The boss table 1403 may further comprise indexes or any other suitable information linked with the components in the synchronous correlithm object processing system 1400. An example of a boss 1402 in operation is described in FIG. 15.

The boss 1402 is in signal communication with the components in the synchronous correlithm object processing system 1400. The boss 1402 is configured to use any suitable type of the signal channels to send commands or instructions 1404 to the components the synchronous correlithm object processing system 1400. The signal channels 14024 may be any suitable type of channel or mechanism for sending commands 1404 to the components in the synchronous correlithm object processing system 1400. The boss 1402 may be configured to send commands 1404 to each of the components individually or all at once.

In one embodiment, the boss 1402 may send commands 1404 in the form of an analog or digital voltage or current signal. For example, the boss 1402 may send a command 1404 as a voltage signal to trigger an action (e.g. execute or output) to be perform by hardware components in the synchronous correlithm object processing system 1400.

In one embodiment, the boss 1402 is configured to receive an input signal 1406. The input signal 1406 may be a trigger signal used to provide a triggering event to the boss 1402 to control the operation of the boss 1402. For example, the boss 1402 may be configured to output a first command or instructions (e.g. an execute command) in response to receiving a first trigger signal and to output a second command or instructions (e.g. an output command) in response to receiving a second trigger signal. The second trigger signal may be the same as or different than the first trigger signal. Examples of the trigger signal include, but are not limited to, a clock signal or a control signal. The trigger signal may be any suitable type of analog or digital signal as would be appreciated by one of ordinary skill in the art.

In another embodiment, the trigger signal may be used to activate the boss 1402 to send commands 1404 to components in the synchronous correlithm object processing system 1400. For example, the boss 1420 may be configured to transition from an inactive state where the boss 1402 does not output any commands 1404 to an activate state where the boss 1402 outputs commands 1404 (e.g. execute commands and output commands). In one example, the boss 1402 continuously outputs commands 1404 once the boss 1402 transitions to the active state without waiting for additional trigger signals. The boss 1402 may be further configured to transition from the active state to the inactive state in response to receiving a second trigger signal.

In another embodiment, the boss 1402 is configured to start or default in the active state where the boss 1402 outputs commands 1404 to the components in the synchronous correlithm object processing system 1400. In this example, the boss 1402 does not rely on a trigger signal to transition the boss 1402 from an inactive state to the active state. The boss 1402 may be configured to use a digital clock to coordinate when to output commands 1404 to the components in the synchronous correlithm object processing system 1400. The digital clock signal may be an internal digital clock provided by the boss 1402 or it may be a digital clock provided by another component (e.g. processor 502 described in FIG. 5).

In another embodiment, the boss 1402 may be configured to receive a correlithm object 104 as a trigger signal. In this example, the boss 1402 may access a table (not shown) that identifies valid correlithm object values. The boss 1402 may compare the received correlithm object 104 to entries in the table to determine whether the correlithm object 104 is a valid trigger signal based on its hamming distance. The receive correlithm object 104 may be determined to be a valid trigger signal when the hamming distance between the received correlithm object 104 and an entry in the table is less than a predetermined threshold. In some embodiment, the table may comprise a list of valid correlithm objects 104 that correspond with different types of commands and/or trigger signals. For instance, a first correlithm object entry may be linked with instructions to send execute commands and a second correlithm object entry may be linked with instructions to send output commands.

The first node 304A is configured to receive an input correlithm object 1408 similar to the first node 304A described in FIG. 12. The first node 304A is configured to determine an output correlithm object in response to receiving an execute command from the boss 1402. The first node 304A may determine the output correlithm object using any suitable technique, for example, using a node table 200. The first node 304A is further configured to output the output correlithm object in response to receiving an output command from the boss 1402. In this example, the first node 304A is configured to output the output correlithm object 104 to the second node 304B (shown as correlithm object 1410) and the third node 304C (shown as correlithm object 1412).

The second node 304B is configured to receive an input correlithm object 1410 from the first node 304A and to determine an output correlithm based on the input correlithm object 1410. The second node 304B determines the output correlithm object in response to receiving an execute command from the boss 1402. The second node 304B may determine the output correlithm object 104 using any suitable technique. The second node 304B is further configured to output the output correlithm object in response to receiving an output command from the boss 1402. In this example, the second node 304B is configured to output the output correlithm object to the fourth node 304D (shown as correlithm object 1414).

The third node 304C is configured to receive an input correlithm object 1412 from the first node 304A and to determine an output correlithm based on the input correlithm object 1412. The third node 304C determines the output correlithm object in response to receiving an execute command from the boss 1402. The third node 304C may determine the output correlithm object 104 using any suitable technique. The third node 304C is further configured to output the output correlithm object 104 in response to receiving an output command from the boss 1402. In this example, the third node 304C is configured to output the output correlithm object to the fourth node 304D (shown as correlithm object 1416).

The fourth node 304D is configured to receive a first input correlithm object 1414 from the second node 304B and a second input correlithm object 1416 from the third node 304C. The fourth node 304D is configured to determine an output correlithm based on the first input correlithm object 1414 and the second correlithm object 1416 in response to receiving an execute command from the boss 1402. The fourth node 304D may determine the output correlithm object 104 using any suitable technique. The fourth node 304D is further configured to output the output correlithm object in response to receiving an output command from the boss 1402. In this example, the fourth node 304D is configured to output the output correlithm object 104 to the fifth node 304E (shown as correlithm object 1418).

The fifth node 304E is configured to receive an input correlithm object 1418 from the fourth node 304D and to determine an output correlithm based on the input correlithm object 1418. The fifth node 304E determines the output correlithm object in response to receiving an execute command from the boss 1402. The fifth node 304E may determine the output correlithm object 104 using any suitable technique. The fifth node 304C is further configured to output the output correlithm object 1420 in response to receiving an output command from the boss 1402. The output correlithm object 104 may be sent to a node 304, a delay node 600, an actor 306, a peripheral device, or any other suitable component.

Figure 15:
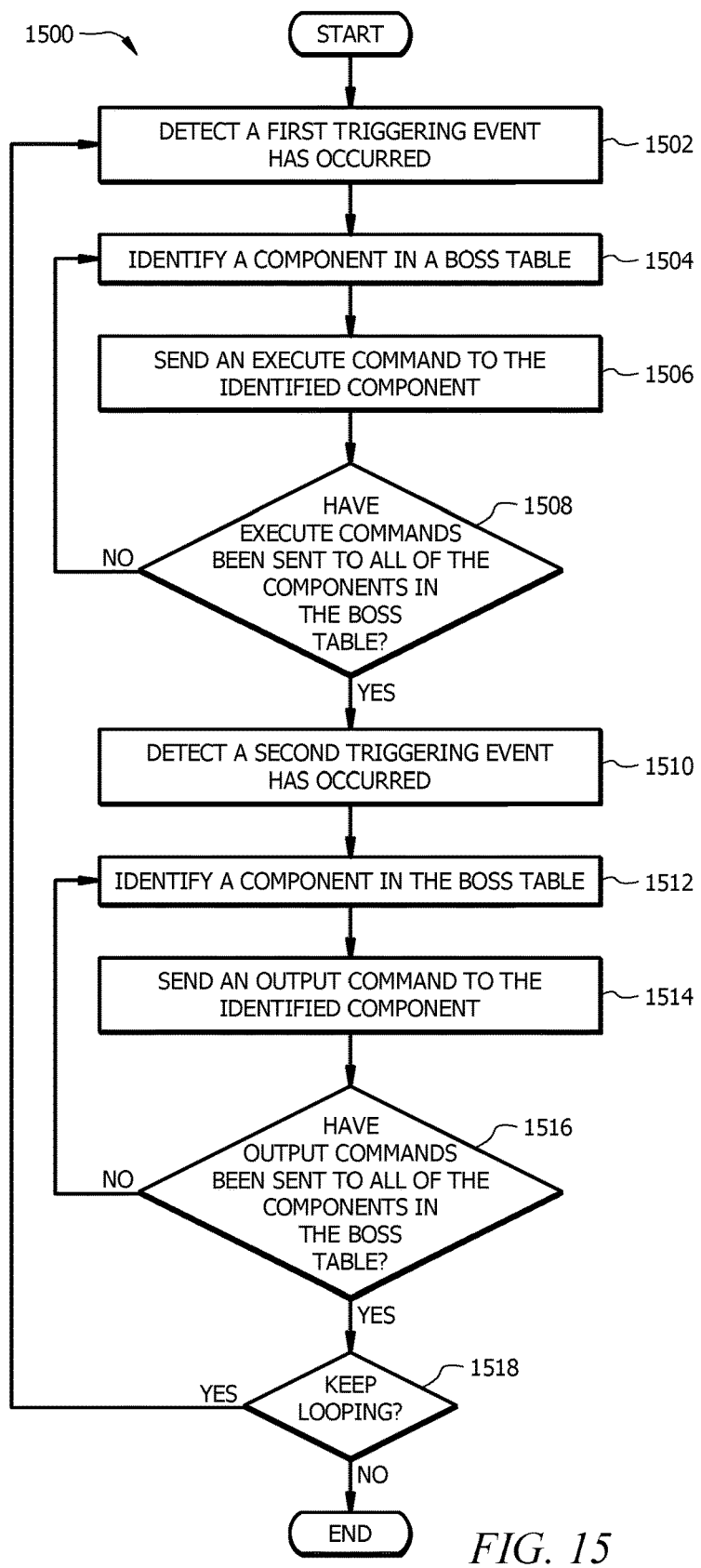
FIG. 15 is a flowchart of an embodiment of a process for emulating a synchronous correlithm object processing system.

FIG. 15 is a flowchart of an embodiment of a process 1500 for emulating a synchronous correlithm object processing system 1400. Process 1500 provides instructions that allows the user device 100 to emulate or implement a synchronous correlithm object processing system 1400.

A non-limiting example is provided below to illustrate how the user device 100 uses process flow 1500 to emulate or implement a synchronous correlithm object processing system 1400. Process 1500 may be applied to any application that involves timing or synchronization between multiple components. In this example, process 1500 is implemented to control the synchronous correlithm object processing system 1400 described in FIG. 14.

At step 1502, the boss 1402 detects a first triggering event has occurred. In one embodiment, the first triggering event is detected when a boss 1402 receives a first trigger signal 1406. The first trigger signal 1406 may be sent by any other component or device. For example, the first trigger signal 1406 may be a command that instructs the boss 1402 to send execute commands to the components in the synchronous correlithm object processing system 1400. As another example, the first trigger signal 1406 may be a portion of a clock signal. For example, the first trigger signal may be a rising edge, a falling edge, a logical high, or logic low portion of a digital clock signal.

In another embodiment, the first trigger signal 1406 may be a command that instructs the boss 1402 to transition from an inactive state to an active state to send execute commands to the components in the synchronous correlithm object processing system 1400. When the boss 1402 transitions to the activate state the boss 1402 may use an internal or external clock signal for coordinating when commands are sent to the components in the synchronous correlithm object processing system 1400.

In another embodiment, the boss 1402 may use a portion of a digital clock signal generated or provided by the boss 1402 as the first trigger signal. For example, the first trigger signal may be a rising edge, a falling edge, a logical high, or logic low portion of a digital clock signal provided by the boss 1402.

At step 1504, the boss 1402 identifies a component in the boss table 1403. The boss 1402 sequentially and iteratively identifies each of the components in the boss table 1403. For example, the boss 1402 may identify the first node 304A on the first iteration of detecting the first triggering event, then identify the second node 304B on the second iteration of detecting the first triggering event, then identify the third node 304C on the third iteration of detecting the first triggering event, and so on. In one embodiment, the boss 1402 may use a pointer (e.g. an array pointer) or index to identify a component in the boss table 1403. The pointer or index may be increment with each iteration to identify the next component in the boss table 1403.

At step 1506, the boss 1402 sends an execute command to the identified component. For example, on the first iteration of detecting the first triggering event, the boss 1402 identifies the first node 304A and sends an execute command to the first node 304A that instructs the first node 304A use an input correlithm object 104 to determine an output correlithm object 104. The execute command may be any suitable type signal or message. The boss 1402 may send the execute command using any suitable protocol as would be appreciated by one of ordinary skill in the art.

At step 1508, the boss 1402 determines whether execute commands have been sent to all of the components in the boss table 1403. In one embodiment, the boss 1402 may use flags (e.g. flag bits) to track which components the boss 1402 has sent execute commands to. The boss 1402 may determine that the boss 1402 has sent execute commands to all of the components when all of the flags are set. In another embodiment, the boss 1402 may use a pointer or index to track which components the boss 1402 has sent execute commands to. The boss 1402 may determine that the boss 1402 has sent execute commands to all of the components when the pointer references the last component in the boss table 1403. In other embodiments, the boss 1402 may use any other suitable technique for tracking which components the has sent execute commands to. The boss 1402 may reset any flags or pointers in response to determining that the boss 1402 has sent execute commands to all of the components in the boss table 1403. The boss 1402 proceeds to step 1510 in response to determining that execute commands have been sent to all of the components in the boss table 1403. Otherwise, the boss 1402 returns to step 1504 to select another component from the boss table 1403. For example, after the first iteration of detecting the first triggering event, the boss 1402 returns to step 1504 to identify and send an execute command to the second node 304B.

At step 1510, the boss 1402 detects a second triggering event has occurred. The boss 1402 may detect the second triggering event using a process similar to the process described in step 1502. For example, the second triggering event is detected when a boss 1402 receives a second trigger signal 1406 from another component or device. The second trigger signal may be a command that instructs the boss 1402 to send output commands to the components in the synchronous correlithm object processing system 1400. As another example, the second trigger signal 1406 may be another portion of a clock signal. For instance, the second trigger signal 1406 may be a rising edge when the first trigger signal 1406 was a falling edge or vice-versa. As another example, the second trigger signal 1406 may be a logical high portion of a clock signal when the first trigger signal is a logic low portion of the clock signal or vice-versa.

At step 1512, the boss 1402 identifies a component from the boss table 1403. The boss 1402 repeats the selection process described in step 1504 to iteratively identify all of the components in the boss table 1403. At step 1514, the boss 1402 sends an output command to the identified component. For example, on the first iteration after detecting the second triggering event, the boss 1402 identifies the first node 304A and sends an output command to the first node 304A that instructs the first node 304A to output the determine output correlithm object 104. The output command may be any suitable type signal or message. The boss 1402 may send the output command using any suitable protocol as would be appreciated by one of ordinary skill in the art.

At step 1516, the boss 1402 determines whether output commands have been sent to all of the components in the boss table 1403. The boss 1402 may use a process similar to the process described in step 1508 to determine whether output commands have been sent to all of the components in the boss table 1403. For example, the boss 1402 may use flags, pointers, indexes, or any other suitable technique. The boss 1402 proceeds to step 1518 in response to determining that output commands have been sent to all of the components in the boss table 1403. Otherwise, the boss 1402 returns to step 1512 to select another component from the boss table 1403.

At step 1518, the boss 1402 determines whether to loop back to wait for another triggering event to repeat process 1500. In one embodiment, the boss 1402 may be configured to loop back to step 1502 to wait for another triggering event to be detect to repeat process 1500. In another embodiment, the boss 1402 may be configured to only execute process 1500 one time and then terminate 1500.

Figure 16:
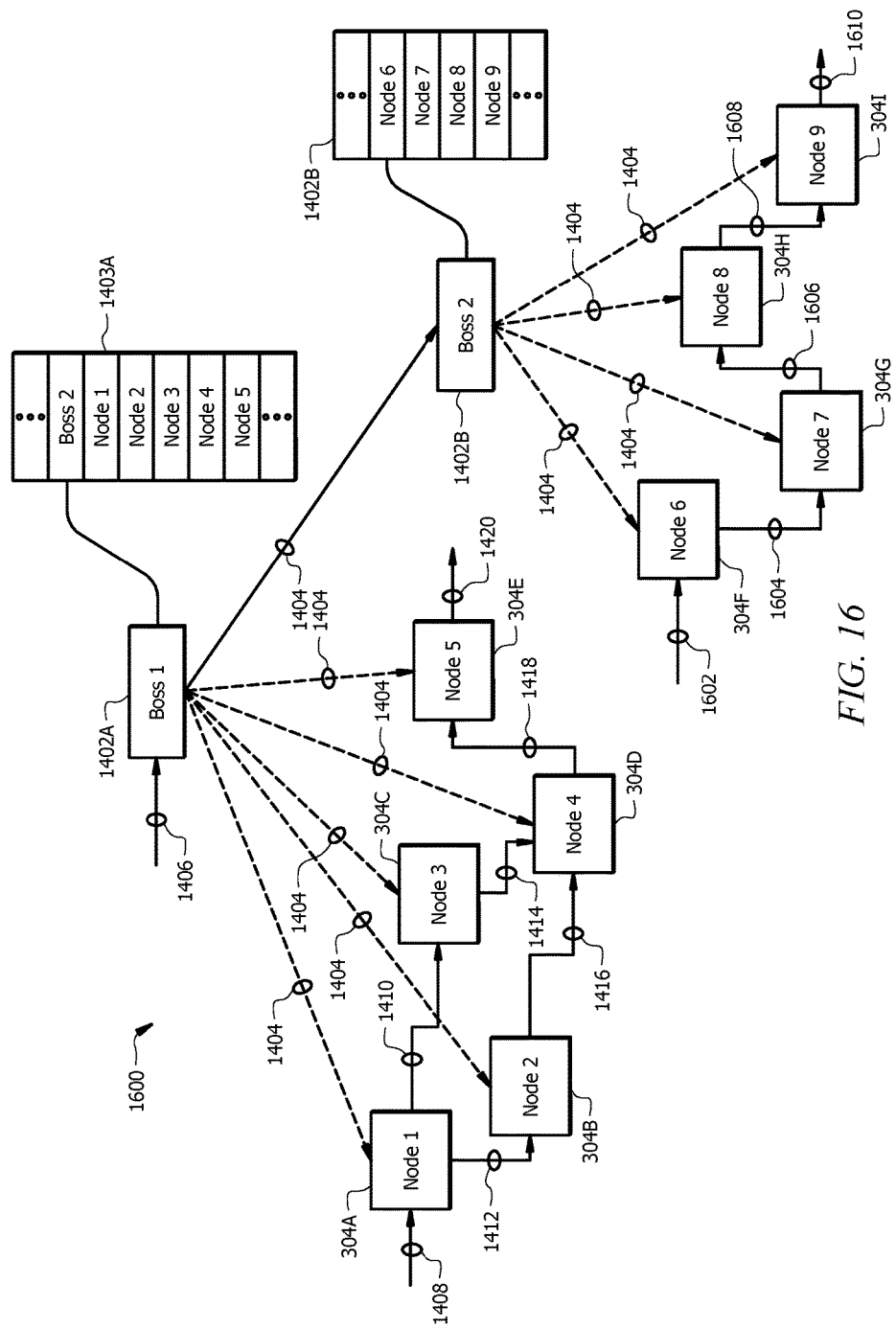
FIG. 16 is a schematic diagram of an embodiment of a synchronous correlithm object processing system with a master boss and a slave boss.

FIG. 16 is a schematic diagram of an embodiment of a synchronous correlithm object processing system 1600 with a master boss and a slave boss. A boss 1402 that sends commands to another boss 1402 may be referred to as a master boss. A boss 1402 that receives commands from another boss 1402 may be referred to as a slave boss. In FIG. 16, boss 1402A is a master boss 1402 that sends commands to control boss 1402B which is a slave boss. Using master bosses and slave bosses allows a synchronous correlithm object 1600 to distribute and synchronize components that may not be implemented on the same processor or device. In other words, a device 100 may use master bosses and slave bosses to allow the synchronous correlithm object processing system 1600 to be implemented using parallel processing with two or more processors, processing cores, or devices. The ability to implement a correlithm object processing system 300 using parallel processing provides a technical advantage by increasing the processing speed and efficiency of the device 100 when performing operations in the correlithm object domain. With parallel processing, components in the correlithm object processing system are able to work in parallel which reduces the amount of time required to perform operations and increase the throughput of the device 100.

In FIG. 16, the synchronous correlithm object processing system 1600 comprises a first boss 1402A in signal communication with a first node 304A, a second node 304B, a third node 304C, a fourth node 304D, a fifth node 304E, and a second boss 1402B. The first boss 1402A is configured to operate in a manner similar to the boss 1402 described in FIG. 14. For example, the first boss 1402A is configured to send commands or instructions (e.g. execute commands and output commands) to the first node 304A, the second node 304B, the third node 304C, the fourth node 304D, the fifth node 304E, and the second boss 1402B. The first node 304A, the second node 304B, the third node, 304C, the fourth node 304D, and the fifth node 304E may be configured to operate similar to the first node 304A, the second node 304B, the third node, 304C, the fourth node 304D, and the fifth node 304E described in FIG. 14, respectively.

The second boss 1402B is in signal communication with a sixth node 304F, a seventh node 304G, an eighth node 304H, and a ninth node 304I. The second boss 1402B is also configured to operate a manner similar to the boss 1402 described in FIG. 14. In this example, the second boss 1402B is configured to receive trigger signals (e.g. commands 1404) from the first boss 1402A. The second boss 1402B is configured to send commands or instructions (e.g. execute commands and output commands) to the sixth node 304F, the seventh node 304G, the eighth node 304H, and the ninth node 304I in response to receiving a trigger signal from the first boss 1402A.

The sixth node 304F is configured to receive an input correlithm object 104 1602 similar to the first node 304A described in FIG. 12. The sixth node 304F is configured to determine an output correlithm object in response to receiving an execute command from the second boss 1402B. The sixth node 304F may determine the output correlithm object using any suitable technique. The sixth node 304F is further configured to output the output correlithm object in response to receiving an output command from the second boss 1402B. In this example, the sixth node 304F is configured to output the output correlithm object 104 to the seventh node 304G (shown as correlithm object 1604).

The seventh node 304G is configured to receive an input correlithm object 1604 from the sixth node 304F and to determine an output correlithm based on the input correlithm object 1604. The seventh node 304G determines the output correlithm object in response to receiving an execute command from the boss 1402B. The seventh node 304G may determine the output correlithm object using any suitable technique. The seventh node 304G is further configured to output the output correlithm object in response to receiving an output command from the boss 1402B. In this example, the seventh node 304F is configured to output the output correlithm object to the eighth node 304H (shown as correlithm object 1606).

The eighth node 304H is configured to receive an input correlithm object 1606 from the seventh node 304G and to determine an output correlithm based on the input correlithm object 1606. The eighth node 304H determines the output correlithm object in response to receiving an execute command from the boss 1402B. The eighth node 304H may determine the output correlithm object using any suitable technique. The eighth node 304H is further configured to output the output correlithm object in response to receiving an output command from the boss 1402B. In this example, the eighth node 304H is configured to output the output correlithm object 104 to the ninth node 304I (shown as correlithm object 1608).

The ninth node 304I is configured to receive an input correlithm object 1608 from the eighth node 304H and to determine an output correlithm based on the input correlithm object 1608. The ninth node 304I determines the output correlithm object in response to receiving an execute command from the boss 1402B. The ninth node 304I may determine the output correlithm object using any suitable technique. The ninth node 304I is further configured to output the output correlithm object in response to receiving an output command from the boss 1402B. In this example, the ninth node 304I is configured to output the output correlithm object 1610. The output correlithm object 1610 may be sent to a node 304, a delay node 600, an actor 306, a peripheral device, or any other suitable component.

Figure 17:
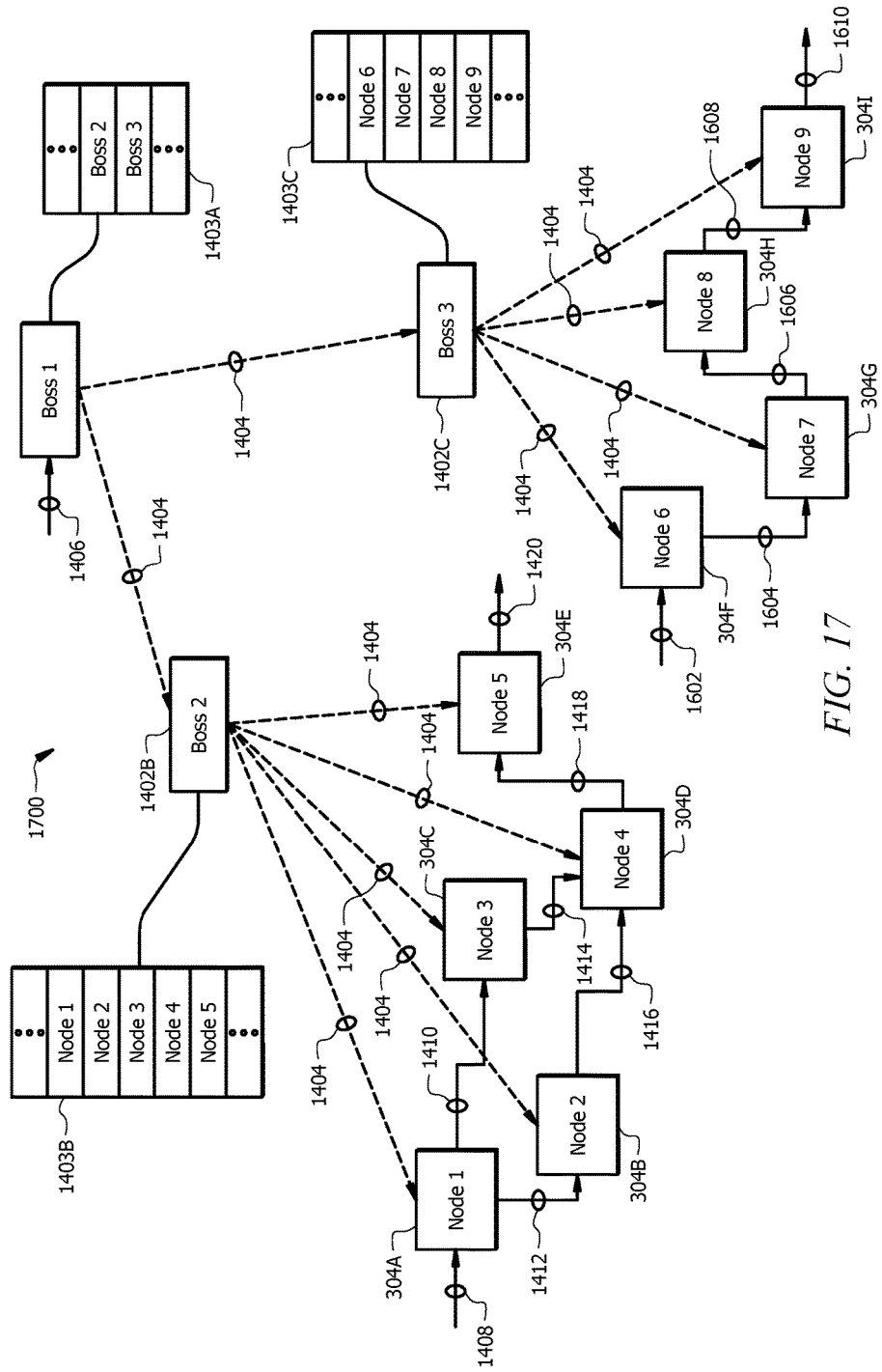
FIG. 17 is a schematic diagram of an embodiment of a synchronous correlithm object processing system with a master boss and multiple slave bosses.

FIG. 17 is a schematic diagram of an embodiment of a synchronous correlithm object processing system 1700 with a master boss and multiple slave bosses. In FIG. 17, nodes 304A-304I may be configured similar to nodes 304A-304I described in FIG. 16. In other embodiments, the synchronous correlithm object processing system 1700 may comprise any other suitable type and/or number of components (e.g. sensors 302, nodes 304, or actors 306). The synchronous correlithm object processing system 1700 may also configured using any other suitable configuration.

Boss 1402B is configured to control nodes 304A-304E and boss 1402C is configured to control nodes 304F-304I. Boss 1402A is in signal communication with bosses 1402B and 1402C and configured to control bosses 1402B and 1402C by sending commands 1404 to the bosses 1402B and 1402C. Boss 1402A uses the commands 1404 to synchronize the components controlled by the bosses 1402B and 1402C. In this example, boss 1402A is configured as a master boss and bosses 1402B and 1402C are configured as slave bosses. In this configuration, boss 1402A has boss table 1403A that identifies bosses 1402B and 1402C. Boss 1402A is configured to iteratively send trigger signals to the bosses 1402B and 1402C. In some embodiments, boss 1402A may be further configured to send trigger signals to other components (not shown).

In this configuration, a master boss can control multiple slave bosses and their components in parallel. A device 100 is able to achieve improved speed and efficiency benefits from parallel processing by distributing the slave bosses and their components among different processing cores or devices. For example, each slave boss may be emulated by a different processing core or device. The master boss allows the device 100 to synchronize and coordinate operations among the different processors or devices.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device configured to emulate an asynchronous correlithm object processing system, comprising:
a node engine configured to emulate:
a first node linked with a first node table, wherein:
the first node table identifies:
a first plurality of correlithm objects, wherein each correlithm object in the first plurality of correlithm objects is a point in a first n-dimensional space represented by a binary string; and
a second plurality of correlithm objects linked with the first plurality of correlithm objects, wherein each correlithm object in the second plurality of correlithm objects is a point in a second n-dimensional space represented by a binary string; and
the first node is configured to:
receive a first correlithm object;
fetch a second correlithm object from among the second plurality of correlithm objects based on the first correlithm object, wherein fetching the second correlithm object comprises:
determining Hamming distances between the first correlithm object and each of the first plurality of correlithm objects;
identifying a correlithm object with the shortest Hamming distance between the first correlithm object and each of the first plurality of correlithm objects; and
identifying an entry in the first node table that corresponds with the identified correlithm object; and
output the second correlithm object to a second node and a third node;
the second node linked with a second node table, wherein:
the second node table identifies:
a third plurality of correlithm objects, wherein each correlithm object in the third plurality of correlithm objects is a point in the second n-dimensional space represented by a binary string; and
a fourth plurality of correlithm objects linked with the third plurality of correlithm objects, wherein each correlithm object in the fourth plurality of correlithm objects is a point in a third n-dimensional space represented by a binary string; and
the second node is configured to:
receive the second correlithm object;
fetch a third correlithm object from among the fourth plurality of correlithm objects based on the second correlithm object, wherein fetching the third correlithm object comprises:
determining Hamming distances between the second correlithm object and each of the third plurality of correlithm objects;
identifying a correlithm object with the shortest Hamming distance between the second correlithm object and each of the third plurality of correlithm objects; and
identifying an entry in the second node table that corresponds with the identified correlithm object; and
output the third correlithm object to the third node.

2. The device of claim 1, wherein determining Hamming distances between the first correlithm object and each of the first plurality of correlithm objects:
performing an XOR operation between the first correlithm object and each of the first plurality of correlithm objects to generate a resulting binary string;
counting the number of logical high values in the resulting binary string; and
identify a correlithm object with the smallest number of logical high values; and
identifying an entry in the first node table that corresponds with the identified correlithm object.

3. The device of claim 1, wherein the first node is configured to receive the first correlithm object from a sensor configured to convert a real world value into the first correlithm object.

4. The device of claim 1, wherein the first node is configured to receive the first correlithm object from a node configured to convert a correlithm object into the first correlithm object.

5. The device of claim 1, wherein the first n-dimensional space, the second n-dimensional space, and the third n-dimensional space all have the same number of dimensions.

6. The device of claim 1, wherein the first n-dimensional space has a different number of dimensions than the second n-dimensional space and the third n-dimensional space.

7. The device of claim 1, wherein:
the first node outputs the second correlithm object as a first input to the third node; and
the second node outputs the third correlithm object as a second input to the third node.

8. A method for emulating an asynchronous correlithm object processing system, comprising:
receiving, by a first node implemented by a node engine, a first correlithm object;
fetching, by the first node, a second correlithm object from a first node table based on the first correlithm object, wherein the first node table identifies:
a first plurality of correlithm objects, wherein each correlithm object in the first plurality of correlithm objects is a point in a first n-dimensional space represented by a binary string; and
a second plurality of correlithm objects linked with the first plurality of correlithm objects, wherein each correlithm object in the second plurality of correlithm objects is a point in a second n-dimensional space represented by a binary string; and
wherein fetching the second correlithm object comprises:
determining Hamming distances between the first correlithm object and each of the first plurality of correlithm objects;
identifying a correlithm object with the shortest Hamming distance between the first correlithm object and each of the first plurality of correlithm objects; and
identifying an entry in the first node table that corresponds with the identified correlithm object; and
outputting, by the first node, the second correlithm object to a second node and a third node implemented by the node engine;
fetching, by the second node, a third correlithm object from a second node table based on the second correlithm object in response to receiving the second correlithm object, wherein the second node table identifies:
a third plurality of correlithm objects, wherein each correlithm object in the third plurality of correlithm objects is a point in the second n-dimensional space represented by a binary string; and
a fourth plurality of correlithm objects linked with the third plurality of correlithm objects, wherein each correlithm object in the fourth plurality of correlithm objects is a point in a third n-dimensional space represented by a binary string; and
wherein fetching the third correlithm object comprises:
determining Hamming distances between the second correlithm object and each of the third plurality of correlithm objects;
identifying a correlithm object with the shortest Hamming distance between the second correlithm object and each of the third plurality of correlithm objects; and
identifying an entry in the second node table that corresponds with the identified correlithm object; and
outputting, by the second node, the third correlithm object to the third node.

9. The method of claim 8, wherein determining Hamming distances between the first correlithm object and each of the first plurality of correlithm objects:
performing an XOR operation between the first correlithm object and each of the first plurality of correlithm objects to generate a resulting binary string;
counting the number of logical high values in the resulting binary string; and
identify a correlithm object with the smallest number of logical high values; and
identifying an entry in the first node table that corresponds with the identified correlithm object.

10. The method of claim 8, further comprising receiving, by the first node, the first correlithm object from a sensor configured to convert a real world value into the first correlithm object.

11. The method of claim 8, further comprising receiving, by the first node, the first correlithm object from a node configured to convert a correlithm object into the first correlithm object.

12. The method of claim 7, wherein the first n-dimensional space, the second n-dimensional space, and the third n-dimensional space all have the same number of dimensions.

13. The method of claim 8, wherein the first n-dimensional space has a different number of dimensions than the second n-dimensional space and the third n-dimensional space.

14. The method of claim 8, wherein:
the first node outputs the second correlithm object as a first input to the third node; and
the second node outputs the third correlithm object as a second input to the third node.

15. A computer program product comprising executable instructions stored in a non-transitory computer readable medium such that when executed by a processor causes the processor to emulate an asynchronous correlithm object processing system configured to:
implement a first node and a second node using a node engine,
receive, using the first node, a first correlithm object;
fetch, using the first node, a second correlithm object from a first node table based on the first correlithm object, wherein the first node table identifies:

a first plurality of correlithm objects, wherein each correlithm object in the first plurality of correlithm objects is a point in a first n-dimensional space represented by a binary string; and a second plurality of correlithm objects linked with the first plurality of correlithm objects, wherein each correlithm object in the second plurality of correlithm objects is a point in a second n-dimensional space represented by a binary string; and wherein fetching the second correlithm object comprises:

determining Hamming distances between the first correlithm object and each of the first plurality of correlithm objects;

identifying a correlithm object with the shortest Hamming distance between the first correlithm object and each of the first plurality of correlithm objects; and identifying an entry in the first node table that corresponds with the identified correlithm object; and output, using the first node, the second correlithm object to a second node and a third node implemented by the node engine;

fetch, using the second node, a third correlithm object from a second node table based on the second correlithm object in response to receiving the second correlithm object, wherein the second node table identifies:

a third plurality of correlithm objects, wherein each correlithm object in the third plurality of correlithm objects is a point in the second n-dimensional space represented by a binary string; and a fourth plurality of correlithm objects linked with the third plurality of correlithm objects, wherein each correlithm object in the fourth plurality of correlithm objects is a point in a third n-dimensional space represented by a binary string; and wherein fetching the third correlithm object comprises:

determining Hamming distances between the second correlithm object and each of the third plurality of correlithm objects;

identifying a correlithm object with the shortest Hamming distance between the second correlithm object and each of the third plurality of correlithm objects; and identifying an entry in the second node table that corresponds with the identified correlithm object; and output, using the second node, the third correlithm object to the third node.

16. The computer program product of claim 15, wherein determining Hamming distances between the first correlithm object and each of the first plurality of correlithm objects:

performing an XOR operation between the first correlithm object and each of the first plurality of correlithm objects to generate a resulting binary string;

counting the number of logical high values in the resulting binary string; and identify a correlithm object with the smallest number of logical high values; and identifying an entry in the first node table that corresponds with the identified correlithm object.

17. The computer program product of claim 15, wherein the first node is configured to receive the first correlithm object from a sensor configured to convert a real world value into the first correlithm object.

18. The computer program product of claim 15, wherein the first node is configured to receive the first correlithm object from a node configured to convert a correlithm object into the first correlithm object.

19. The computer program product of claim 15, wherein the first n-dimensional space, the second n-dimensional space, and the third n-dimensional space all have the same number of dimensions.

20. The computer program product of claim 15, wherein the first n-dimensional space has a different number of dimensions than the second n-dimensional space and the third n-dimensional space.

* * * * *